US012054894B2

(12) United States Patent
Kim et al.

(10) Patent No.: US 12,054,894 B2
(45) Date of Patent: Aug. 6, 2024

(54) APPARATUS AND METHOD OF APPLYING MAGNETIC PATTERN TO LANES WITH MAGNETIC PAINT

(71) Applicant: JEONGSEOK CHEMICAL CORPORATION, Jeollabuk-do (KR)

(72) Inventors: Yong-Hyun Kim, Jeollabuk-do (KR); Seok-Hee Im, Jeollabuk-do (KR); Dae-Won Kim, Jeollabuk-do (KR)

(73) Assignee: JEONGSEOK CHEMICAL CORPORATION, Jeollabuk-do (KR)

( * ) Notice: Subject to any disclaimer, the term of this patent is extended or adjusted under 35 U.S.C. 154(b) by 358 days.

(21) Appl. No.: 17/336,722

(22) Filed: Jun. 2, 2021

(65) Prior Publication Data

US 2021/0381177 A1 Dec. 9, 2021

(30) Foreign Application Priority Data

Jun. 8, 2020 (KR) ........................ 10-2020-0069083
Mar. 2, 2021 (KR) ........................ 10-2021-0027220

(51) Int. Cl.

| | |
|---|---|
| ***B05C 9/12*** | (2006.01) |
| ***B05D 3/00*** | (2006.01) |
| ***E01C 23/16*** | (2006.01) |
| ***E01C 23/20*** | (2006.01) |
| ***E01F 9/506*** | (2016.01) |
| ***E01F 9/518*** | (2016.01) |
| ***H01F 7/20*** | (2006.01) |
| ***H01F 27/08*** | (2006.01) |

(Continued)

(52) U.S. Cl.
CPC .............. *E01C 23/20* (2013.01); *B05D 3/207* (2013.01); *E01C 23/166* (2013.01); *E01F 9/506* (2016.02); *E01F 9/518* (2016.02); *H01F 7/20* (2013.01); *H01F 27/08* (2013.01); *B05C 9/12* (2013.01); *B05D 5/00* (2013.01); *H01F 13/003* (2013.01)

(58) Field of Classification Search
None
See application file for complete search history.

(56) References Cited

U.S. PATENT DOCUMENTS 3,078,183 A * 2/1963 Karalus ...................... C09J 7/20
40/621
3,472,200 A * 10/1969 Gerling .................... H05B 6/80
118/643

(Continued)

FOREIGN PATENT DOCUMENTS

EP 0977138 A2 2/2000
EP 3418845 A1 12/2018

(Continued)

*Primary Examiner* — Binu Thomas
(74) *Attorney, Agent, or Firm* — Wells St. John P.S.

(57) ABSTRACT

Disclosed herein are an apparatus and method for applying a magnetic pattern to lanes with magnetic paint. The apparatus includes an electromagnet for generating a write magnetic field toward the ground by being installed in a moving object, a current supplier for providing the current required to generate the write magnetic field, a portable power generator for supplying power required in order for the current supplier to generate the current, and a cooler for dissipating heat generated from at least one of the electromagnet and the current supplier.

3 Claims, 22 Drawing Sheets

(51) Int. Cl.
*B05D 5/00* (2006.01)
*H01F 13/00* (2006.01)

(56) References Cited

U.S. PATENT DOCUMENTS

| | | | | |
|---|---|---|---|---|
| 3,477,352 | A * | 11/1969 | Glenroy | E01C 23/222 404/94 |
| 3,575,255 | A | 4/1971 | Wickstrom | |
| 4,765,773 | A * | 8/1988 | Hopkins | E01C 23/081 34/259 |
| 5,853,846 | A | 12/1998 | Clark | |
| 6,037,019 | A * | 3/2000 | Kooyer | C23C 24/04 427/195 |
| 6,378,772 | B1 * | 4/2002 | Yonemura | G08G 1/096758 235/449 |
| 6,636,390 | B2 | 10/2003 | Funayama et al. | |
| 2008/0189038 | A1 | 8/2008 | Hole | |
| 2016/0240301 | A1 | 8/2016 | Yeom et al. | |
| 2018/0330863 | A1 * | 11/2018 | Hwang | H01F 27/2871 |
| 2019/0031076 | A1 * | 1/2019 | Yamamoto | G05D 1/021 |
| 2020/0332483 | A1 * | 10/2020 | Michiharu | E01C 23/163 |
| 2021/0010214 | A1 * | 1/2021 | Bell | E01F 9/518 |
| 2021/0300381 | A1 | 9/2021 | Hong | |

FOREIGN PATENT DOCUMENTS

| | | | | |
|---|---|---|---|---|
| EP | 211777354 | | | 3/2022 |
| JP | H09-269821 | | * | 10/1997 |
| KR | 10-2001-0092304 | A | | 10/2001 |
| KR | 10-0682513 | B1 | | 6/2004 |
| KR | 10-2010-0061226 | A | | 6/2010 |
| KR | 10-2015-0066290 | A | | 6/2015 |
| KR | 10-2015-0125115 | A | | 11/2015 |
| KR | 10-2019-0115503 | A | | 10/2019 |
| WO | WO 2005/120922 | | | 12/2005 |
| WO | WO 2020/027530 | A1 | | 2/2020 |

* cited by examiner

APPARATUS AND METHOD OF APPLYING MAGNETIC PATTERN TO LANES WITH MAGNETIC PAINT

CROSS REFERENCE TO RELATED APPLICATIONS

This application claims the benefit of Korean Patent Applications No. KR 10-2020-0069083, filed Jun. 8, 2020, and claims priority to KR 10-2021-0027220, filed Mar. 2, 2021, which are hereby incorporated by reference in their entireties into this application.

BACKGROUND OF THE INVENTION

1. Technical Field

The present invention relates to technology for drawing lanes with paint including magnetic particles and for efficiently applying a magnetic pattern to the magnetic particles included in the lanes, thereby providing information related to driving of a vehicle and the like and efficiently applying a magnetic pattern to the lanes drawn with the magnetic paint even in a place that is difficult for a large construction vehicle to enter.

2. Description of the Related Art

Unless otherwise indicated herein, the materials described in this section are not the prior art with regard to the claims in this application, and are not admitted to be prior art by inclusion in this section.

Research and development related to autonomous vehicles is actively underway these days, and autonomous vehicles are now being commercialized and released.

The most important thing in autonomous driving is technology for recognizing lanes, and technology for drawing lanes with magnetic paint and enabling autonomous vehicles to recognize the lanes drawn with the magnetic paint is being developed.

Here, the magnetic paint may provide not only the lanes for autonomous driving in the form of magnetic signals but also useful information, e.g., the speed of a traveling vehicle, information about the distance from a nearby vehicle, and the like, using a written alternating magnetic pattern.

To this end, technology for applying a specific magnetic pattern to lanes drawn with magnetic paint is required.

DOCUMENTS OF RELATED ART (Patent Document 1) Korean Patent No. 10-0682513, registered on Feb. 7, 2007 and titled “Stopping system and method for railroad vehicle using magnetic pattern”.

SUMMARY OF THE INVENTION

An object of the present invention is to apply a magnetic pattern simultaneously with construction of lanes while a construction vehicle for construction of the lanes is moving.

Another object of the present invention is to present a detailed configuration of a magnetic pattern application apparatus that is capable of accommodating a device for supplying sufficient electric power to apply a magnetic pattern to lanes.

A further object of the present invention is to provide an apparatus that has a miniaturized and lightweight structure and is capable of applying a magnetic pattern to lanes with magnetic paint while a person is moving the apparatus using his/her hands in a place that is difficult for an assistance vehicle or a large construction vehicle to enter.

Yet another object of the present invention is to provide technology for applying a magnetic pattern to lanes with magnetic paint such that an alternating magnetic pattern that can be recognized by autonomous vehicles is generated using only the electric power supplied from a miniaturized and lightweight power source.

Still another object of the present invention is to apply magnetic particles to previously constructed lanes, thereby applying a magnetic pattern that can be detected by autonomous vehicles.

Still another object of the present invention is to adjust parameter values related to application of a magnetic pattern depending on the road and ground conditions, thereby more effectively applying the magnetic pattern to lanes with magnetic paint.

The objects of the present invention are not limited to the above objects, and it is apparent that other objects can be derived from the following description.

In order to accomplish the above objects, an apparatus for applying a magnetic pattern to lanes with magnetic paint according to an embodiment of the present invention includes an electromagnet for generating a write magnetic field toward ground by being installed in a moving object, a current supplier for providing a current required for generating the write magnetic field, a portable power generator for supplying a power required in order for the current supplier to generate the current, and a cooler for dissipating heat generated from at least one of the electromagnet, the current supplier, and the portable power generator.

Here, the apparatus may further include a paint material storage unit for storing the base material of paint and a paint application device for applying the base material of the paint to the ground.

Here, the electromagnet may be installed behind the paint application device based on the direction in which the moving object travels.

Here, the electromagnet may include a main pole for providing the write magnetic field and an auxiliary pole for absorbing magnetic flux generated by the main pole.

Here, the distance from the ground to the electromagnet may be greater than 0 mm and equal to or less than 100 mm.

Here, the apparatus may further include a surface protection unit installed in the surface of the electromagnet, the surface facing the ground.

Here, the current supplier and the portable power generator may be installed in an auxiliary moving object that is separate from the moving object in which the electromagnet is installed.

Here, the apparatus may further include a ground sensor for generating video information corresponding to the ground.

Here, the current supplier may adjust the magnitude of the current based on the video information.

Here, the distance from the ground to the electromagnet may be adjusted based on the video information.

Also, in order to accomplish the above objects, a method for applying a magnetic pattern to lanes with magnetic paint according to an embodiment of the present invention includes applying magnetic particles, corresponding to paint, to ground, supplying a power for generating an alternating current (AC), providing the alternating current to an electromagnet installed in a moving object, and generating, by the electromagnet, a write magnetic field for magnetizing the magnetic particles toward the ground.

Here, the method may further include applying the paint to the ground using a paint application device.

Here, the electromagnet may be installed behind the application device based on the direction in which the moving object travels.

Here, the electromagnet may include a main pole for providing the write magnetic field and an auxiliary pole for absorbing magnetic flux generated by the main pole.

Here, generating the write magnetic field may be configured such that the electromagnet located at a distance of 0 to 100 mm from the ground generates the write magnetic field for magnetizing the magnetic particles toward the ground.

Here, the method may further include generating video information corresponding to the ground.

Here, providing the alternating current may be configured to provide the alternating current after adjusting the magnitude thereof based on the video information.

Here, the distance from the ground to the electromagnet may be adjusted based on the video information.

Also, in order to accomplish the above objects, an apparatus for applying a magnetic pattern to lanes with magnetic paint according to an embodiment of the present invention includes an electromagnet for generating a write magnetic field toward ground by being installed in a moving object, a current supplier for providing a current required for generating the write magnetic field, a portable power generator for supplying a power required in order for the current supplier to generate the current, and a cooler for dissipating heat generated from at least one of the electromagnet, the current supplier, and the portable power generator. Magnetic particles included in the base material of paint applied to the ground may be ferromagnetic particles having a coercive force greater than 100 Oersted (Oe) and equal to or less than 1000 Oe.

Here, the electromagnet located at a certain distance from the ground may generate the write magnetic field having a strength greater than the coercive force of the magnetic particles.

Here, the certain distance from the ground to the electromagnet may be greater than 0 mm and equal to or less than 300 mm.

Here, the current supplier may supply a current equal to or less than 100 amperes, and the portable power generator may supply a power equal to or less than 3 kW.

Here, the apparatus may further include a paint material storage unit for storing the base material of the paint and a paint application device for applying the base material of the paint to the ground.

Here, the electromagnet may be installed behind the paint application device based on the direction in which the moving object travels.

Here, the electromagnet may include a main pole for providing the write magnetic field and an auxiliary pole for absorbing magnetic flux generated by the main pole.

Here, the apparatus may further include a surface protection unit installed in the surface of the electromagnet, the surface facing the ground.

Here, the apparatus may further include a ground sensor for generating video information corresponding to the ground.

Here, the current supplier may adjust the magnitude of the current based on the video information.

Here, the distance from the ground to the electromagnet may be adjusted based on the video information.

Also, in order to accomplish the above objects, a method for applying a magnetic pattern to lanes with magnetic paint according to an embodiment of the present invention includes applying magnetic particles, corresponding to paint, to a ground, supplying a power for generating an alternating current (AC), providing the alternating current to an electromagnet installed in a moving object, and generating, by the electromagnet, a write magnetic field for magnetizing the magnetic particles toward the ground. The magnetic particles may be ferromagnetic particles having a coercive force greater than 100 Oersted (Oe) and equal to or less than 1000 Oe.

Here, the electromagnet located at a certain distance from the ground may generate the write magnetic field having a strength greater than the coercive force of the magnetic particles.

Here, the certain distance from the ground to the electromagnet may be greater than 0 mm and equal to or less than 300 mm.

Here, the alternating current may be equal to or less than 100 amperes, and the power may be equal to or less than 3 kW.

Here, the method may further include applying the paint to the ground using a paint application device.

Here, the electromagnet may be installed behind the application device based on the direction in which the moving object travels.

Here, the electromagnet may include a main pole for providing the write magnetic field and an auxiliary pole for absorbing magnetic flux generated by the main pole.

Here, the method may further include generating video information corresponding to the ground.

Here, providing the alternating current may be configured to provide the alternating current after adjusting the magnitude thereof based on the video information.

Here, the distance from the ground to the electromagnet may be adjusted based on the video information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
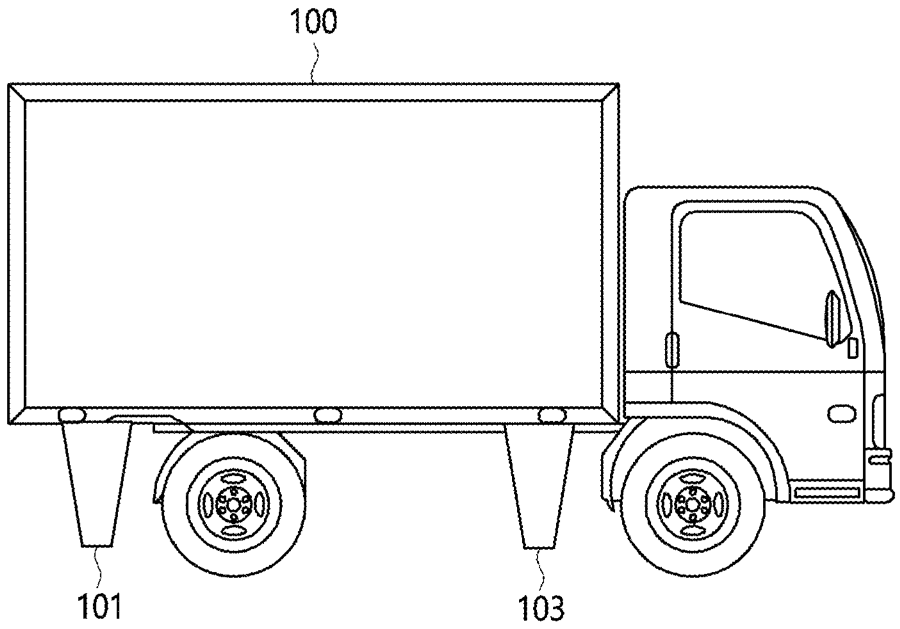
FIG. 1 is an exemplary view of an apparatus for applying a magnetic pattern to lanes with magnetic paint according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is an exemplary view of an apparatus for applying a magnetic pattern to lanes with magnetic paint according to an embodiment of the present invention.

Referring to FIG. 1, the apparatus for applying a magnetic pattern to lanes with magnetic paint according to an embodiment of the present invention may apply the base material of paint to the ground so as to draw lanes and may apply a magnetic pattern to magnetic particles included in the lanes drawn on the ground using a moving object 100, such as a vehicle, and a paint application device 103 and an electromagnet 101, which are attached to the moving object 100.

Figure 2:
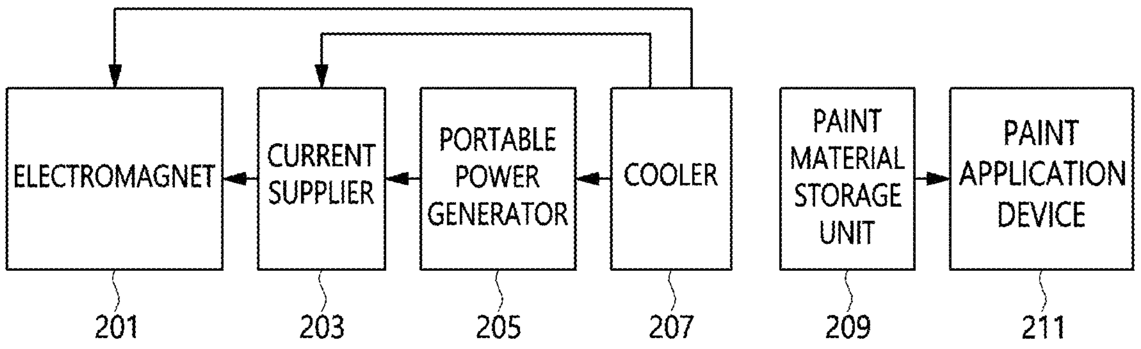
FIG. 2 is a block diagram of an apparatus for applying a magnetic pattern to lanes with magnetic paint according to an embodiment of the present invention.

FIG. 2 is a block diagram of an apparatus for applying a magnetic pattern to lanes with magnetic paint according to an embodiment of the present invention.

Referring to FIG. 2, the apparatus for applying a magnetic pattern to lanes with magnetic paint according to an embodiment of the present invention may include an electromagnet 201, a current supplier 203, a portable power generator 205, and a cooler 207.

Also, the apparatus for applying a magnetic pattern to lanes with magnetic paint according to an embodiment of the present invention may further include a paint material storage unit 209 and a paint application device 211.

Here, the electromagnet 201 installed in a moving object may generate a write magnetic field toward the ground.

Here, the electromagnet 201 is installed behind the paint application device 211 based on the direction in which the moving object travels, so that the paint application device 211 first applies paint including magnetic particles to the ground so as to correspond to lanes, after which the electromagnet 201 at the rear may apply a magnetic pattern to the magnetic particles included in the lanes.

Also, the electromagnet 201 may include a main pole for providing a write magnetic field and an auxiliary pole for absorbing the magnetic flux generated by the main pole, which will be described later with reference to FIGS. 6 to 7.

Here, the electromagnet 201 may be installed in the moving object such that the electromagnet 201 is located at a distance greater than 0 mm and equal to or less than 100 mm from the ground.

Here, the magnetic pattern applied to the lanes by the write magnetic field may be recognized by a vehicle including a magnetic sensor when the vehicle is being driven.

Here, the magnetic sensor may detect not only the magnetic pattern but also a magnetic signal caused by the irregularity of a road surface, deformation or imbalance of tires, an engine, a vehicle itself, vibration caused during driving, or the like as noise.

Because the noise commonly has a frequency equal to or less than 30 Hz, it is desirable that the signal of the alternating magnetic pattern to be detected from the magnetic paint included in the lanes have a frequency equal to or greater than 30 Hz in order to recognize only the magnetic pattern, excluding the noise. That is, the alternating magnetic pattern is formed so as to be differentiated from noise, whereby the noise may be avoided and a high signal-to-noise ratio may be achieved.

Also, the magnetic paint included in the lanes for autonomous driving has a remarkable effect when a vehicle is being driven at a speed equal to or greater than 20 km/h, compared to when being driven at low speed. Therefore, in order to make the frequency of the magnetic pattern equal to or greater than 30 Hz at speeds equal to or greater than 20 km/h, it is desirable to set the interval of the magnetic pattern recorded on lanes to be equal to or less than 5 m.

Here, the apparatus for applying a magnetic pattern to lanes with magnetic paint according to an embodiment of the present invention may further include a surface protection unit capable of preventing impurities from being attached to the surface of the electromagnet facing the ground and preventing the electromagnet from being damaged.

More specifically, the surface protection unit may prevent contamination of the electromagnet 201, which occurs when nearby iron powder, magnetic powder, or the like adheres to the electromagnet 201 due to the strong magnetic field generated by the electromagnet 201. Therefore, it is desirable for the surface protection unit to be formed of a nonmagnetic material.

Also, the surface protection unit may prevent damage to the surface of the electromagnet 201 due to friction or scratches when the electromagnet 201 is located close to the ground.

Here, the current supplier 203 may provide current required for generating a write magnetic field to the electromagnet 201.

Here, the current supplier 203 may be formed as a circuit capable of providing alternating current (AC) to the electromagnet 201.

Here, the current supplier 203 needs to provide a large amount of current in order to apply a magnetic pattern to lanes, as will be described later, and the required amount of current may be calculated using Equation (1) below:

$$B = \mu_0(H + M) = \mu_0\left(\frac{Ni}{L} + M\right) = \mu_0\mu_r H = \mu H \quad (1)$$

Here, B denotes a magnetic field, and μ and $\mu_r$ respectively denote the permeability and relative permeability of a material. In the following embodiment, the material is assumed to be pure iron, so the relative permeability is set to 1000.

Here, $\mu_0$ denotes magnetic permeability in a vacuum, N denotes the number of turns of a coil wound around pure iron, and i denotes the amount of current that is applied.

Here, when B is assumed to 16 kG and when Ni=1 is assumed, the current supplier 203 has to apply current of about 200 A to the coil wound around the electromagnet 201.

Here, assuming that the resistance of the coil is about 0.6 Ω, 120 V is required.

Accordingly, in order to apply a magnetic pattern to lanes using the electromagnet 201, the amount of electric power equal to or greater than 24 kW may be required. Here, the calculated amount of electric power is an underestimated value when an electromagnet having a simple structure is exemplified for the convenience of description, and considering a complex 3D electromagnet, more electric power may be required.

Meanwhile, the amount of electric power that is required in order to apply a magnetic pattern to lanes may change depending on the distance between the electromagnet 201 and the paint corresponding to the lanes and on the magnetic characteristics of the magnetic particles contained in the paint corresponding to the lanes.

Here, the portable power generator 205 may supply the power such that the current supplier 203 generates current, in which case the supplied power may be AC power.

Here, according to the above-described embodiment, the portable power generator 205 needs to be able to supply a sufficient amount of power for the current supplier 203 to generate current of 200 A.

Also, because heat is generated from the electromagnet 201 when a large amount of current is applied thereto, it is necessary to dissipate the heat generated from the electromagnet 201 using the cooler 207.

Also, heat generated in the process in which the current supplier 203 generates current or in which the power generator 205 supplies power may be dissipated through the cooler 207.

Generally, power is supplied from an internal power supply in a building or the like. However, in the present invention, because power must be supplied outdoors when lanes are constructed, the portable power generator 205 has to be included in the moving object along with the electromagnet 201 and the current supplier 203.

Here, a portable power generator 205 capable of supplying more than 24 kW of electric power according to an embodiment of the present invention may have a volume equal to or greater than 1 m×1 m×1 m and a weight equal to or greater than one ton. Accordingly, the portable power generator 205 may be installed in the moving object or an auxiliary moving object physically connected to the moving object, as will be described later, thereby supplying power to the current supplier 203 while moving.

Here, the cooler 207 may dissipate the heat generated from at least one of the electromagnet 201, the current supplier 203, and the portable power generator 205.

More specifically, heat is generated from the electromagnet 201, the current supplier 203, and the portable power generator 205 due to a high level of electric power, and when this heat is ignored, they may be damaged. Therefore, the cooler 207 may dissipate the heat generated from the electromagnet 201, the current supplier 203, and the portable power generator 205 through forced circulation of refrigerant or the like.

Here, the paint material storage unit 209 may store the base material of the paint for drawing lanes.

Here, the base material of the paint may be paint including magnetic particles, but may be paint including no magnetic particles, as will be described later.

Here, when the base material of the paint is paint including no magnetic particles, a device for applying magnetic particles to the applied paint may be further included, as will be described later.

Here, the paint application device 211 may apply the base material of the paint to the ground, and more specifically, may draw lanes for guiding a vehicle by applying the base material of the paint to a road or the like.

Here, if the base material of the paint is paint including no magnetic particles, a magnetic pattern can be applied only when magnetic particles are included in the paint applied to the ground so as to correspond to lanes. Accordingly, the apparatus for applying a magnetic pattern to lanes with magnetic paint according to an embodiment of the present invention may further include a magnetic particle storage unit for storing magnetic particles and a magnetic particle application unit.

The magnetic particle application unit may be installed behind the paint application device 212 and in front of the electromagnet 201 based on the direction in which the moving object travels.

The reason for placing the magnetic particle application unit between the paint application device 212 and the electromagnet 201 is for applying paint to the ground so as to correspond to the lanes using the paint application unit 211, applying magnetic particles to the paint corresponding to the lanes using the magnetic particle application unit, and then applying a magnetic pattern to the paint in which the magnetic particles are included, that is, the magnetic paint corresponding to the lanes, using the electromagnet 201.

Also, the apparatus for applying a magnetic pattern to lanes with magnetic paint according to an embodiment of the present invention may further include a ground sensor for generating video information corresponding to the ground.

Here, the ground sensor may be a distance sensor for measuring the distance from the ground on which the lanes are drawn, a general camera, or a camera capable of extracting depth information.

When the ground sensor is a distance sensor, the video information may be generated based on the distance from the ground in a specific area using the distance sensor, and depth information relative to the ground may be extracted.

When the ground sensor is a general camera, the video information may include an image captured using the general camera and the distance from the ground, which is measured by analyzing the image.

Here, the current supplier 203 may adjust the magnitude of current to be supplied to the electromagnet 201 based on the video information, which will be described in detail later with reference to FIG. 11.

Here, the distance from the electromagnet 201 to the ground may be adjusted based on the video information, which will be described in detail later with reference to FIG. 12.

Figure 33:
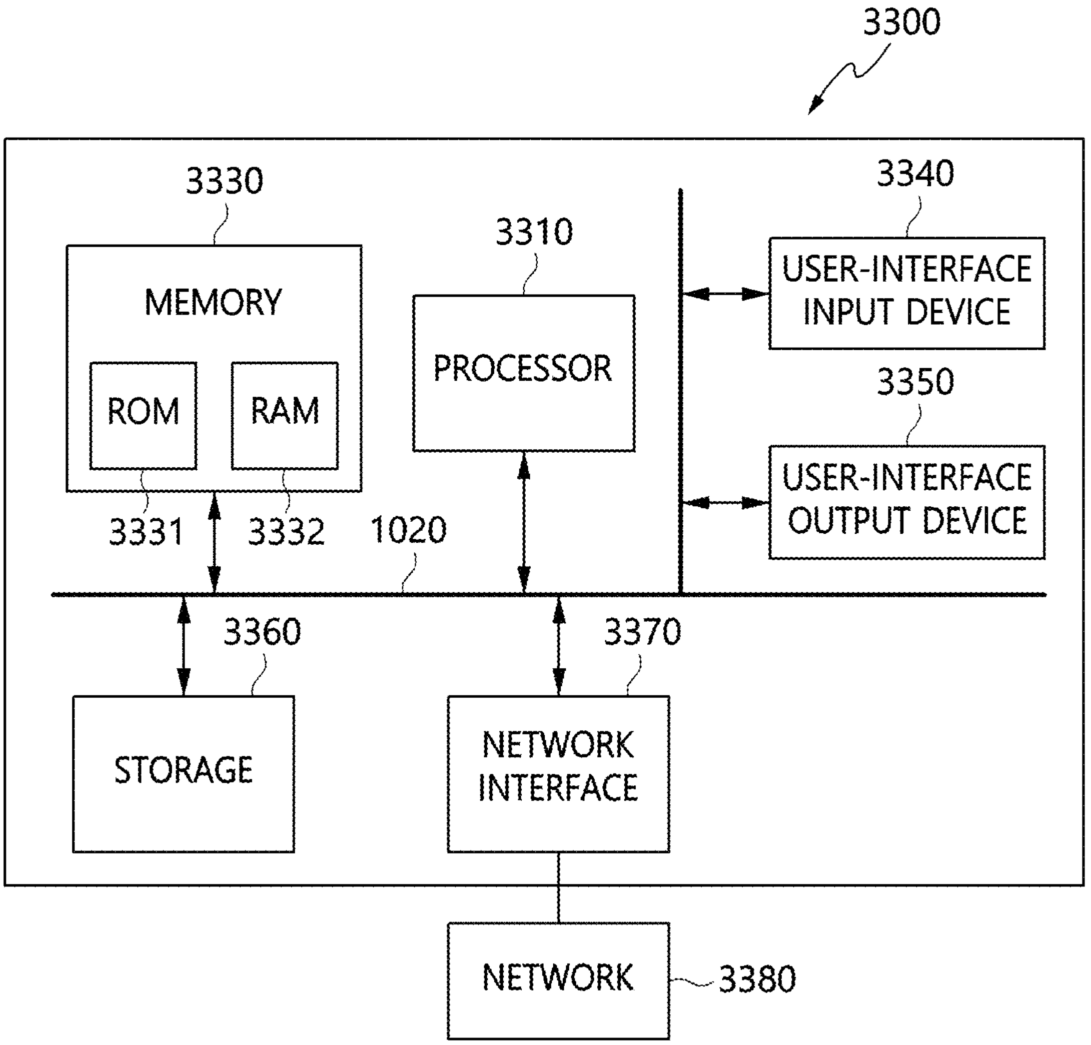
FIG. 33 is a view illustrating a computer system according to an embodiment of the present invention.

Here, the apparatus for applying a magnetic pattern to lanes with magnetic paint according to an embodiment of the present invention may include a controller for controlling the electromagnet 201, the current supplier 203, the portable power generator 205, the cooler 207, the paint material storage unit 209, the paint application device 211, and the ground sensor, and the controller may be a computer system including a processor, memory, storage, and the like, as illustrated in FIG. 33.

Figure 3:
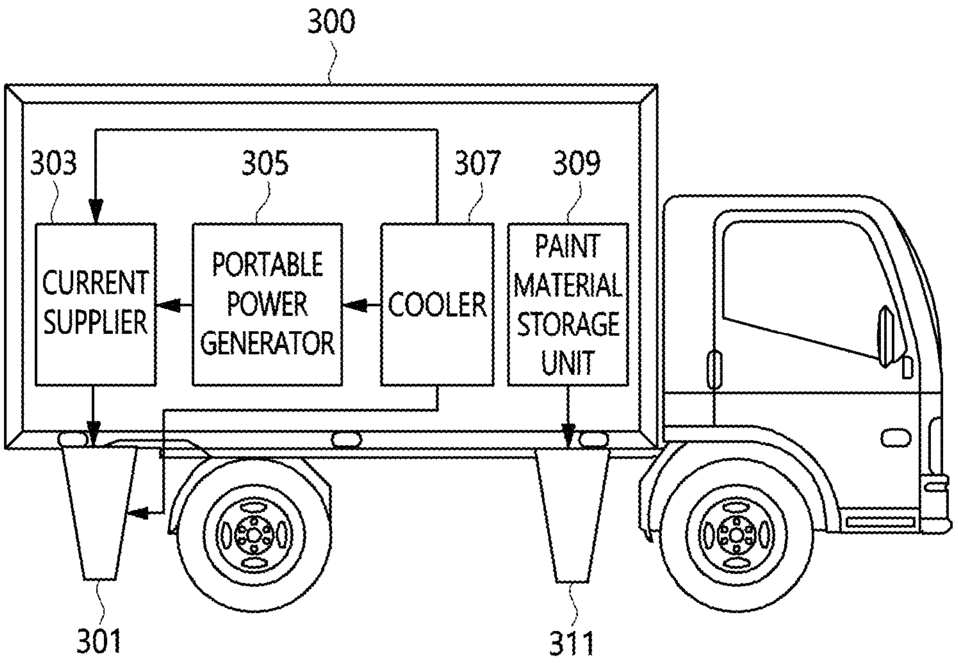
FIG. 3 is an exemplary view illustrating application of an apparatus for applying a magnetic pattern to lanes with magnetic paint according to an embodiment of the present invention to a moving object.

FIG. 3 is an exemplary view illustrating application of an apparatus for applying a magnetic pattern to lanes with magnetic paint according to an embodiment of the present invention to a moving object.

Referring to FIG. 3, the apparatus for applying a magnetic pattern to lanes with magnetic paint according to an embodiment of the present invention may be implemented by being applied to a moving object 300, such as a vehicle or the like, which is capable of moving.

Here, an electromagnet 301 and a paint application device 311 are installed to be close to the ground, thereby generating a write magnetic field or applying paint to the ground so as to correspond to lanes.

Here, a current supplier 303, a portable power generator 305, a cooler 307, and a paint material storage unit 309 may be accommodated in the moving object 300.

Here, the electromagnet 301, the current supplier 303, the portable power generator 305, the cooler 307, the paint material storage unit 309, and the paint application device 311 may be the same as the electromagnet 201, the current supplier 203, the portable power generator 205, the cooler 207, the paint material storage unit 209, and the paint application device 211 described with reference to FIG. 2.

Figure 4:
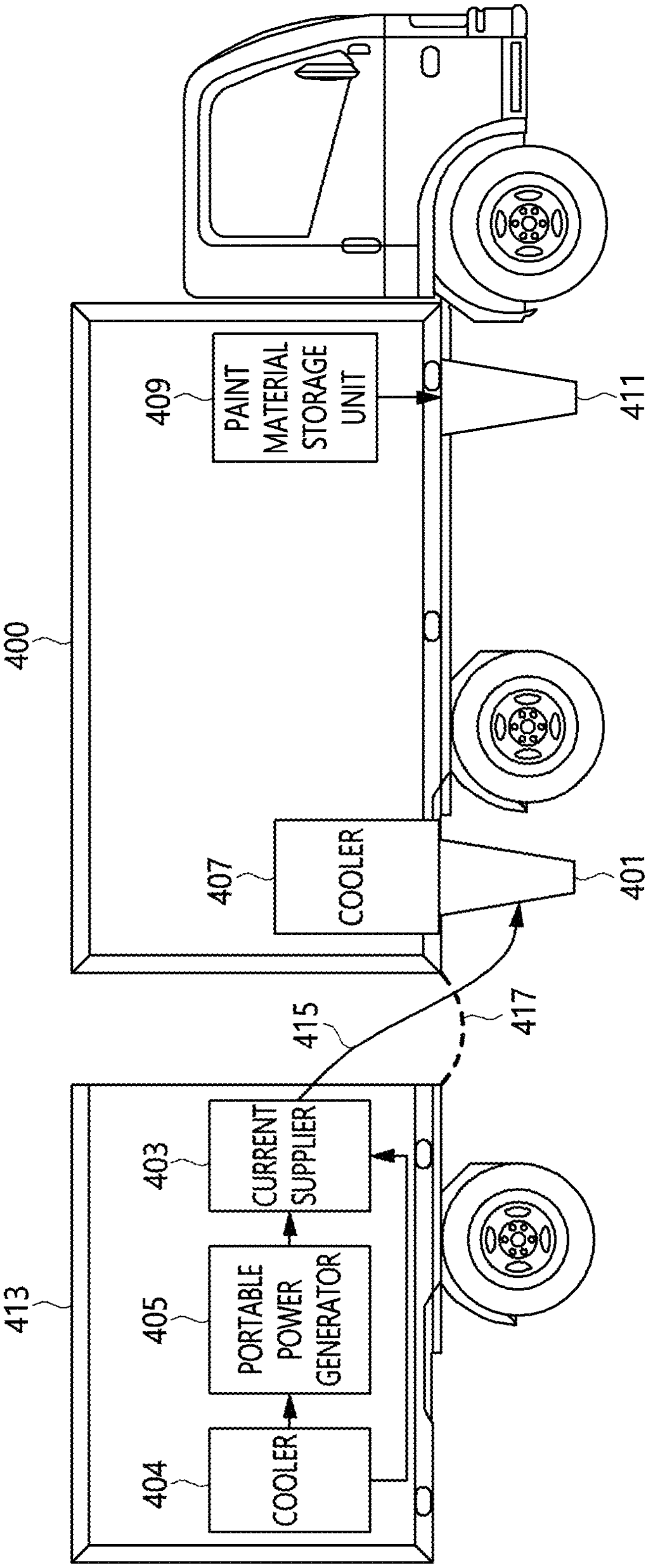
FIG. 4 is an exemplary view illustrating application of an apparatus for applying a magnetic pattern to lanes with magnetic paint according to an embodiment of the present invention to a moving object and an auxiliary moving object.

FIG. 4 is an exemplary view illustrating application of an apparatus for applying a magnetic pattern to lanes with magnetic paint according to an embodiment of the present invention to a moving object and an auxiliary moving object.

Referring to FIG. 4, the apparatus for applying a magnetic pattern to lanes with magnetic paint according to an embodiment of the present invention may be divided and installed in a moving object 400 and an auxiliary moving object 413.

More specifically, the moving object 400 and the auxiliary moving object 413 may include a means for moving, such as wheels or the like, and may be connected with each other using a connection part 417.

Here, the moving object 400 may accommodate at least one of an electromagnet 401, a current supplier 403, a portable power generator 405, a cooler 407, a paint material storage unit 409, and a paint application device 411, and the remaining components may be accommodated in the auxiliary moving object 413.

According to an embodiment, the moving object 400 may accommodate the electromagnet 401, the cooler 407, the paint material storage unit 409, and the paint application device 411, and the auxiliary moving object 413 may accommodate the current supplier 403, the portable power generator 405, and an additional cooler 404 for dissipating the heat generated from the current supplier 403 and the portable power generator 405 accommodated in the auxiliary moving object 413.

Here, it is desirable for the current supplier 403 and the portable power generator 405 to supply a large amount of electric power, equal to or greater than 20 kW, in order to enable the electromagnet 401 to generate a write magnetic field having sufficient strength.

Accordingly, the current supplier 403 and the portable power generator 405 capable of supplying a large amount of electric power equal to or greater than 20 kW may have a volume equal to or greater than 1 m×1 m×1 m and a weight equal to or greater than one ton, and thus they may be installed in the auxiliary moving object 413, which is separate from the moving object 400 that is used for constructing lanes by applying paint.

Here, when the current suppler 403 is installed in a moving object that is different from the moving object in which the electromagnet 401 is installed, current may be provided to the electromagnet 401 using electric wires 415.

Here, the electromagnet 401, the current supplier 403, the portable power generator 405, the cooler 407, the paint material storage unit 409, and the paint application device 411 may be the same as the electromagnet 201, the current supplier 203, the portable power generator 205, the cooler 207, the paint material storage unit 209, and the paint application device 211 described with reference to FIG. 2.

Figure 5:
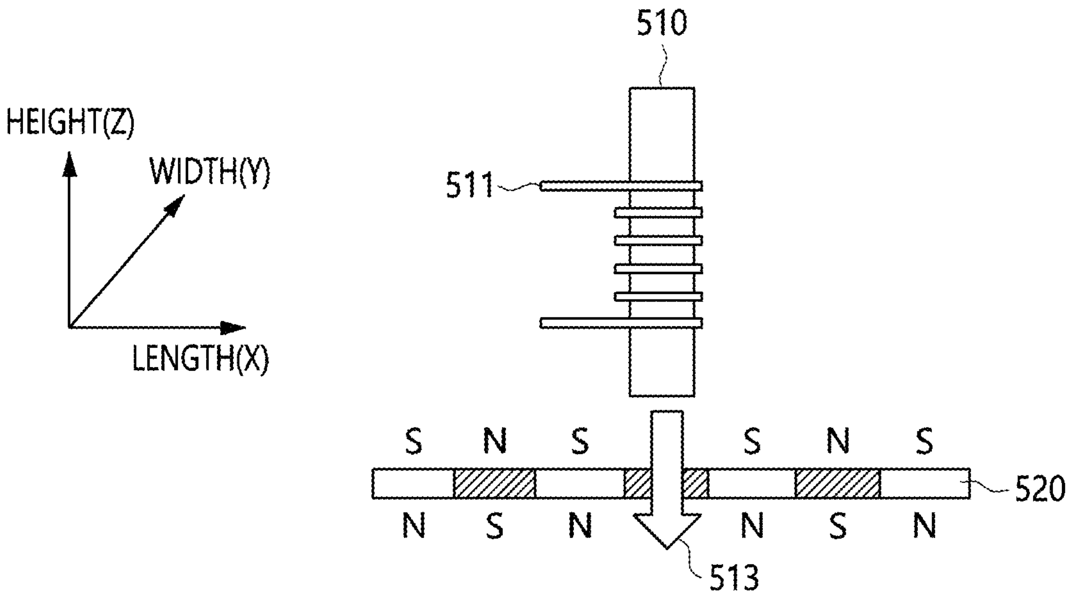
FIG. 5 is an exemplary view illustrating application of a magnetic pattern to lanes using an electromagnet according to an embodiment of the present invention.

FIG. 5 is an exemplary view illustrating application of a magnetic pattern to lanes using an electromagnet according to an embodiment of the present invention.

Referring to FIG. 5, an electromagnet 510 may be configured by winding a coil 511 around a magnetic body, and may generate a write magnetic field by which the coil 511 is supplied with current.

Here, it is desirable that the magnetic body be formed of a ferromagnetic body. Also, it is desirable that the magnetic body be made of soft magnetic iron (Fe) or metal mixed with soft magnetic iron.

Here, the coil 511 is connected with a current supplier, thereby being supplied with current from the current supplier.

Here, the electromagnet 510 generates a write magnetic field when it is passing over the magnetic paint 520 applied so as to correspond to lanes, thereby applying an alternating magnetic pattern, in which N and S poles are repeated, to the lanes.

The electromagnet 510 illustrated in FIG. 5 is configured with a single main pole, but in this case, the efficiency of generation of a write magnetic field is somewhat low. Therefore, the electromagnet 510 may be implemented by further including an auxiliary pole behind or in front of the main pole.

Here, if the remanent magnetization of the ferromagnetic body in paint corresponding to the lanes is turned into a vertical component, a magnetic sensor in a vehicle may detect the magnetic pattern more easily. Accordingly, it is desirable to use a vertical magnetic recording method that uses a vertical magnetic component in a vertical direction, that is, a height direction (z).

Also, according to an embodiment of the present invention, a remanent magnetization may be formed in a horizontal direction by increasing the strength of a write magnetic field.

Figure 6:
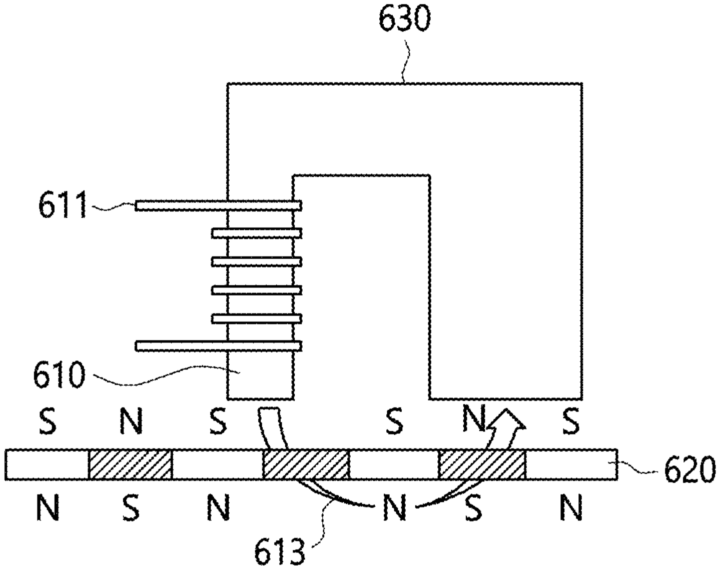
FIG. 6 and FIG. 7 are exemplary views illustrating an electromagnet configured with a main pole and an auxiliary pole according to an embodiment of the present invention.
Figure 7:
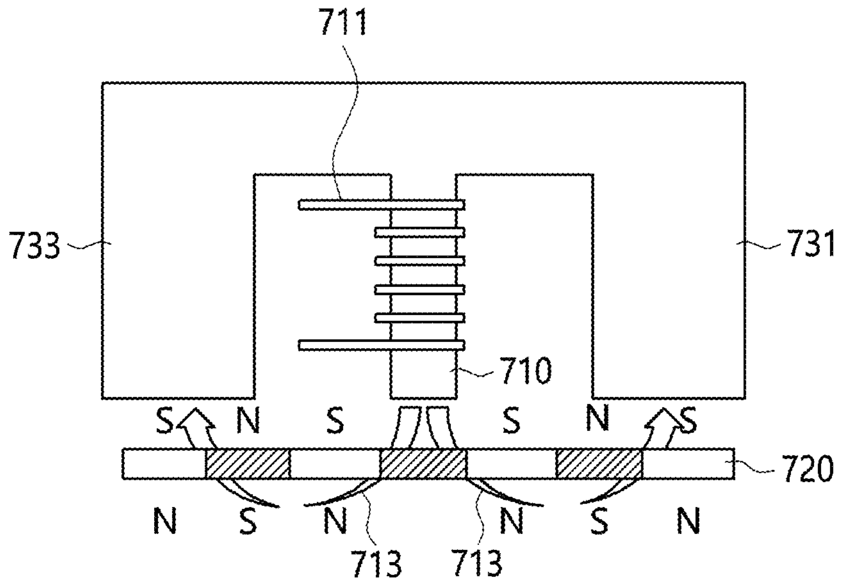

FIG. 6 and FIG. 7 are exemplary views illustrating an electromagnet configured with a main pole and an auxiliary pole according to an embodiment of the present invention.

Referring to FIG. 6 and FIG. 7, an electromagnet may include a main pole for providing a write magnetic field and an auxiliary pole (a trailing pole or a leading pole) for absorbing magnetic flux generated by the main pole.

In the case of an electromagnet including only a main pole, the efficiency of generation of a write magnetic field may be low.

Referring to FIG. 6, the electromagnet may include a main pole 610 wound with a coil 611 and an auxiliary pole 630 for absorbing magnetic flux on any one of the front and rear sides of the main pole 610.

Referring to FIG. 7, the electromagnet may include a main pole 710 wound with a coil and auxiliary poles 731 and 733 for absorbing magnetic flux on the front and rear sides of the main pole 710.

Here, the magnetic flux 613 or 713 generated by the main pole 610 or 710 is absorbed by the auxiliary pole 630 or the auxiliary poles 731 and 733, whereby a magnetic pattern may be more efficiently applied to magnetic paint corresponding to lanes.

Figure 8:
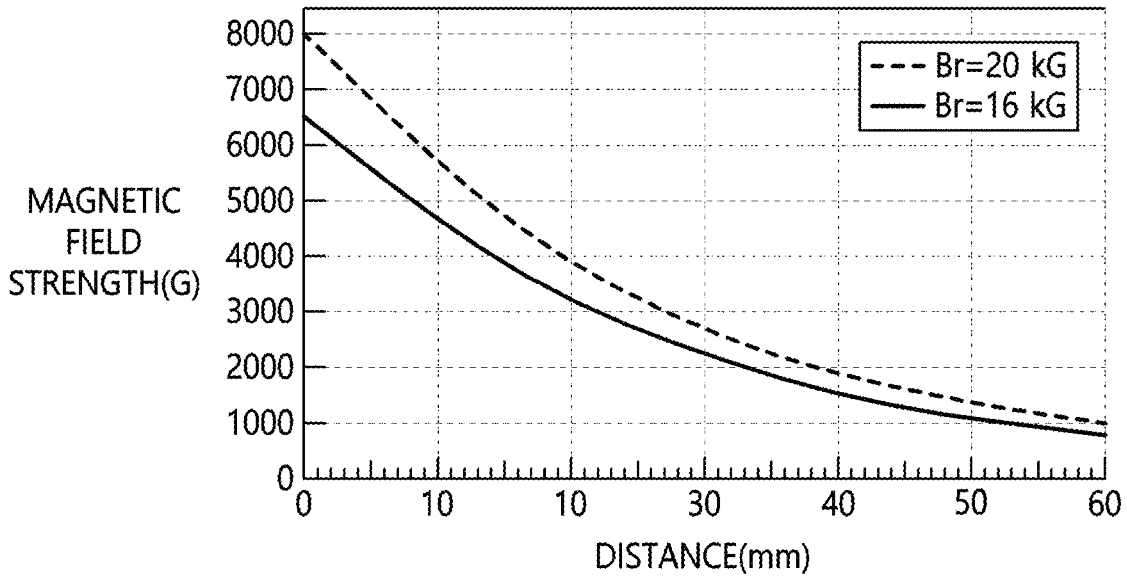
FIG. 8 is a graph representing variation in a vertical magnetic component depending on the height of an electromagnet.

FIG. 8 is a graph illustrating variation in a vertical magnetic component depending on the height of an electromagnet.

Here, the electromagnet is assumed to be a single main pole having the shape of a parallelepiped, of which the length, the width, and the height are 100 mm, 150 mm, and 50 mm, respectively, and of which a remanent magnetization is assumed to be 20 kG or 16 kG.

The graph of FIG. 8 illustrates the strength of a write magnetic field that varies in a vertical direction from the center of the surface of the electromagnet, which has a parallelepiped shape, and it is confirmed that the strength of the write magnetic field rapidly decreases as being farther from the center of the surface of the main pole.

Particularly, it can be seen that the strength of the write magnetic field at a location 20 mm distant from the main pole is about 3000 to 4000 G.

Here, because an actual electromagnet is formed in a complex 3D shape, when the strength of a write magnetic field is calculated in consideration of magnetic lines coming out of all surfaces of the electromagnet, the calculated strength of the write magnetic field may be much less than the value shown in the graph of FIG. 8.

Accordingly, the output of the current supplier and the output of the portable power generator may be determined by taking into consideration the distance between the electromagnet and the ground, as will be described later.

Figure 9:
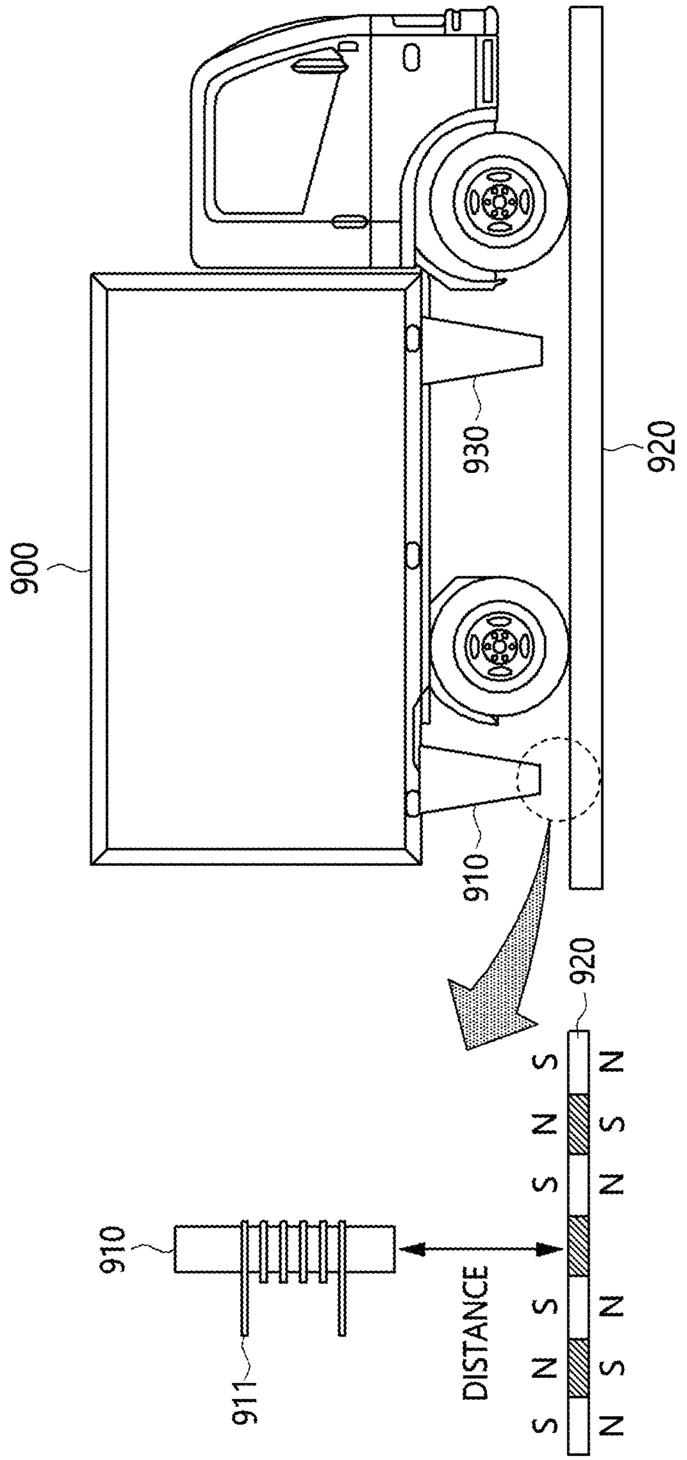
FIG. 9 is a conceptual diagram illustrating the distance between an electromagnet and the ground.

FIG. 9 is a conceptual diagram illustrating the distance between an electromagnet and the ground.

Referring to FIG. 9, when a paint application device 930 and an electromagnet 910 are installed in a moving object 900, the distance between the electromagnet 910 and the ground 920 is very important, as described above.

Here, the electromagnet 900 wound with a coil 911 may adjust the strength of the write magnetic field to be generated depending on the distance from the ground 920.

Figure 10:
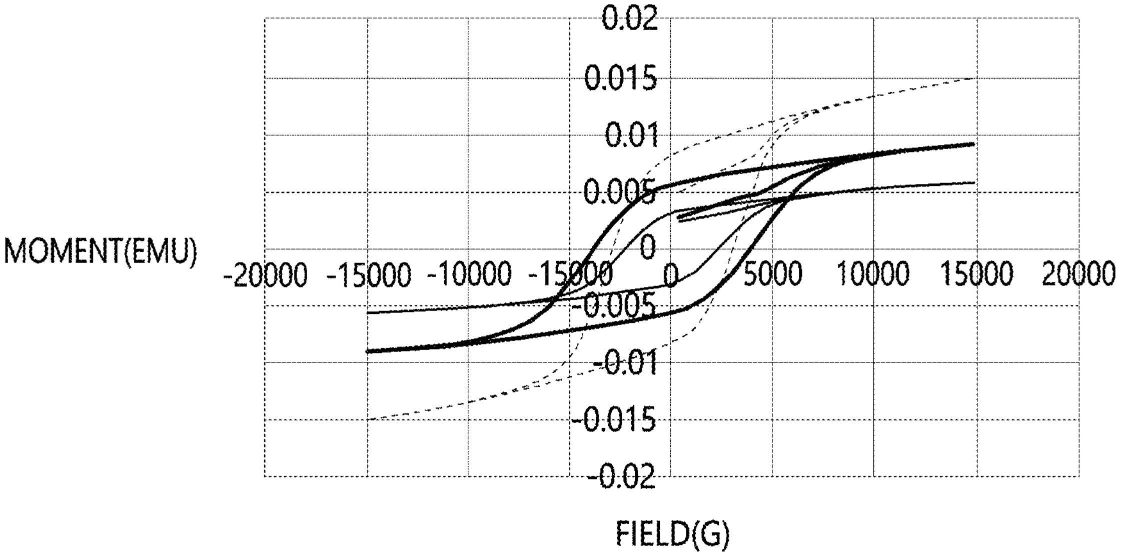
FIG. 10 is a graph representing the magnetic characteristics of paint in which hard magnetic strontium ferrite formed in a circular shape having a diameter of 6 mm is contained.

FIG. 10 is a graph representing the magnetic characteristics of paint that contains hard magnetic strontium ferrite formed in a circular shape having a diameter of 6 mm.

The magnetic particle contained in magnetic paint with which lanes are drawn may have a remanent magnetization detectable by a magnetic sensor only when a write magnetic field, the strength of which is greater than a coercive force, is applied.

That is, the greater the strength of a write magnetic field, the greater the remanent magnetization, and the greater the remanent magnetization, the stronger the detection signal, whereby a magnetic sensor may acquire a more clear signal.

FIG. 10 is a graph representing the magnetic characteristics of different types of strontium ferrite having different generation methods and different processing methods when a strontium ferrite particle is included as a magnetic particle mixed with paint. Here, the magnetic paint is made by being mixed with a magnetic particle formed in a circular shape having a diameter of 6 mm.

Strontium ferrite has different magnetic characteristics depending on the generation method and the processing method thereof.

Here, referring to FIG. 10, the coercivity of magnetic paint containing strontium ferrite ranges from 1.2 kG to 4.0 kG, and the remanent magnetization of the magnetic paint, in which the weights of the paint and the magnetic particle are taken into consideration, ranges from 0.12 emu/g to 0.75 emu/g. Accordingly, it is confirmed that the coercivity and the remanent magnetization vary significantly depending on the generation method and the size of strontium ferrite.

Here, in order to change the magnetization direction of a strontium ferrite particle having a coercivity of 4.0 kG, the strength of a write magnetic field should be much greater than 4.0 kG. Accordingly, in the case of an electromagnet having a remanent magnetization of 20 kG, illustrated in FIG. 8, writing is possible only when the distance between the electromagnet and the lanes is maintained equal to or less than about 19 mm, and in the case of an electromagnet having a remanent magnetization of 16 kG, writing is possible only when the distance between the electromagnet and the lanes is maintained equal to or less than about 13 mm.

In another example, when maghemite ($\gamma$-$Fe_2O_3$) having a coercivity equal to or greater than about 300 G, which is used for audiotape or videotape, is added to paint as a magnetic particle, it may be desirable to maintain the distance between the electromagnet and the paint equal to or less than about 100 mm.

Also, when a strontium ferrite particle having a coercivity of 1.2 kG and an electromagnet having a remanent magnetization of 20 kG or 16 kG are used, it may be desirable to maintain the distance between the electromagnet and the paint equal to or less than about 50 mm.

However, the calculated distance is overestimated, compared to the distance in the field, and writing is possible only when the distance is maintained much less than the calculated distance.

Accordingly, the distance or interval between the electromagnet and the ground is an important factor for determining the specifications of a current supplier and a portable power generator, as described above, and may be an important factor for determining the strength of a signal coming out of the magnetic particle.

Accordingly, the apparatus for applying a magnetic pattern to lanes with magnetic paint according to an embodiment of the present invention may further include a magnetic particle sensor for sensing the size of a magnetic particle, corresponding to the base material of paint, by attaching the same to a paint material storage unit.

Here, at least one of the current to be supplied by the current supplier, the power to be supplied by the portable power generator, and the distance between the electromagnet and the ground may be changed based on the size of the magnetic particle sensed using the magnetic particle sensor.

Figure 11:
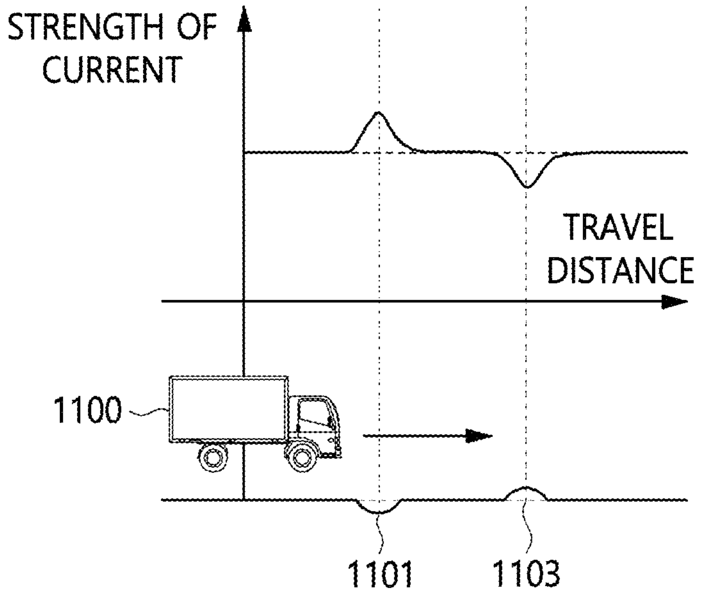
FIG. 11 is a conceptual diagram illustrating adjustment of the strength of the current of an electromagnet depending on the irregularity of the ground.

FIG. 11 is a conceptual diagram illustrating adjustment of the strength of current supplied to an electromagnet depending on the irregularity of the ground.

Referring to FIG. 11, a current supplier may adjust the magnitude of current supplied to the electromagnet based on video information.

More specifically, when a moving object 1100 encounters a groove 1101 or a raised spot 1103 while moving on the ground, because the distance between the electromagnet installed in the moving object 1100 and the ground is changed, a write magnetic field having accurate strength may not be imparted to the magnetic paint corresponding to the lanes.

In order to compensate for this, the current supplier provides current, the strength of which is greater than that of a reference current, when the moving object 1100 passes over the groove 1101, but provides current, the strength of which is less than that of the reference current, when the moving object 1100 passes over the raised spot 1103, thereby enabling a write magnetic field having uniform strength to be generated.

Here, the groove 1101 and the raised spot 1103 may be recognized using video information acquired using the above-described ground sensor or the like.

Figure 12:
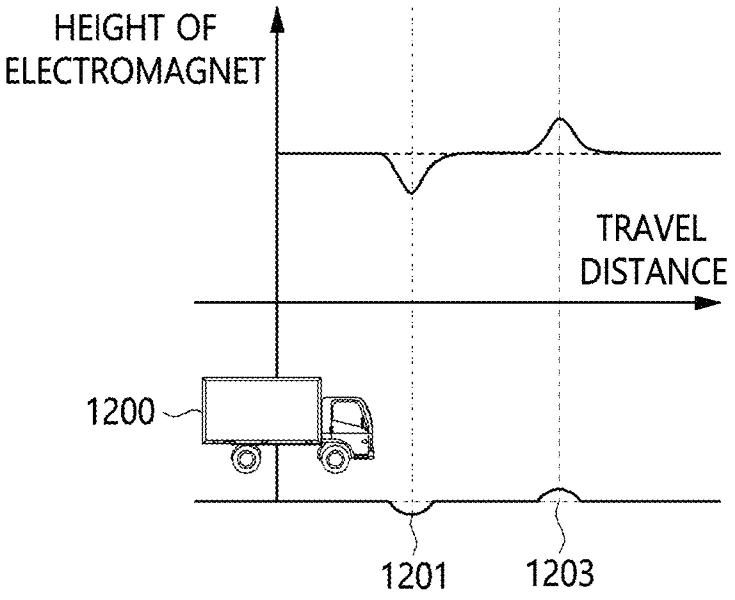
FIG. 12 is a conceptual diagram illustrating adjustment of the height of an electromagnet depending on the irregularity of the ground.

FIG. 12 is a conceptual diagram illustrating adjustment of the height of an electromagnet depending on the irregularity of the ground.

Referring to FIG. 12, an electromagnet is installed in a moving object 1200 such that the height thereof can be adjusted, and the height of the electromagnet is adjusted depending on the video information, whereby the distance between the ground on which the lanes are drawn and the electromagnet may be adjusted.

More specifically, when the moving object 1200 encounters a groove 1201 or a raised spot 1203 while moving on the ground, because the distance between the electromagnet installed in the moving object 1200 and the ground is changed, a write magnetic field having accurate strength may not be imparted to magnetic paint corresponding to lanes.

In order to compensate for this, the electromagnet may be configured to move downwards to the ground when the moving object 1200 passes over the groove 1201, and to move in the direction opposite the direction toward the ground when the moving object 1200 passes over the raised spot 1203, whereby a write magnetic field having uniform strength may be imparted to magnetic paint corresponding to the lanes.

Here, the groove 1201 and the raised spot 1203 may be recognized using video information acquired using the above-described ground sensor or the like.

Figure 13:
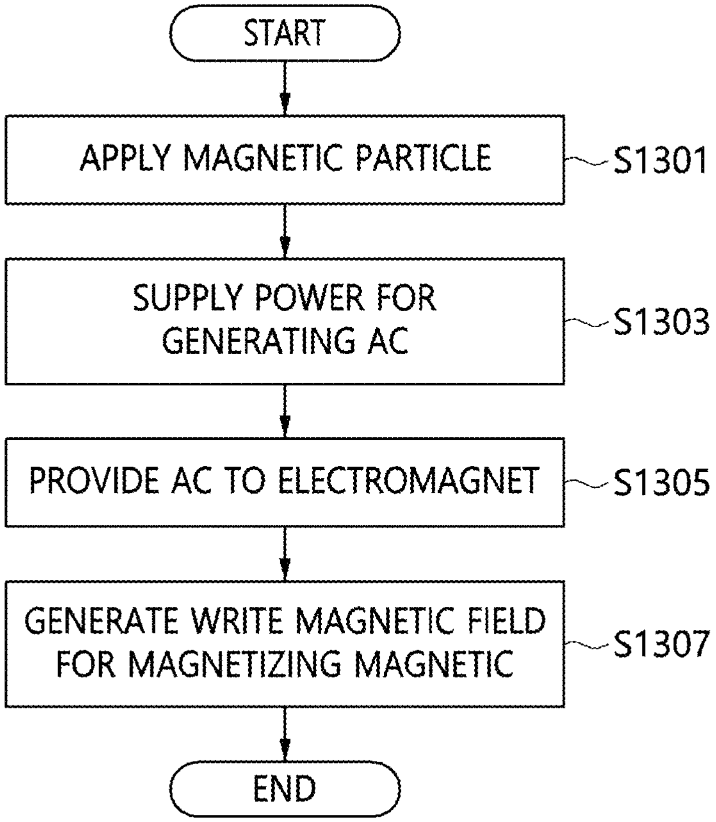
FIG. 13 is a flowchart of a method for applying a magnetic pattern to lanes with magnetic paint according to an embodiment of the present invention.

FIG. 13 is a flowchart of a method for applying a magnetic pattern to lanes with magnetic paint according to an embodiment of the present invention.

Referring to FIG. 13, in the method for applying a magnetic pattern to lanes with magnetic paint according to an embodiment of the present invention, first, magnetic particles corresponding to paint are applied to the ground at step S1301.

Also, in the method for applying a magnetic pattern to lanes with magnetic paint according to an embodiment of the present invention, power for generating alternating current (AC) is supplied at step S1303.

Also, in the method for applying a magnetic pattern to lanes with magnetic paint according to an embodiment of the present invention, AC is provided to an electromagnet installed in a moving object at step S1305.

Here, at step S1305, the magnitude of AC may be adjusted based on video information, and may then be provided.

Also, in the method for applying a magnetic pattern to lanes with magnetic paint according to an embodiment of the present invention, the electromagnet generates a write magnetic field for magnetizing the magnetic particles toward the ground at step S1307.

Here, at step S1307, the electromagnet at a location 0 to 100 mm apart from the ground may generate a write magnetic field for magnetizing the magnetic particles toward the ground.

Here, the method for applying a magnetic pattern to lanes with magnetic paint according to an embodiment of the present invention may further include applying paint to the ground so as to correspond to lanes using a paint application device.

Here, the electromagnet may be installed behind the paint application device based on the direction in which the moving object travels.

Here, the electromagnet may include a main pole for providing the write magnetic field and an auxiliary pole for absorbing magnetic flux generated by the main pole.

Here, the method for applying a magnetic pattern to lanes with magnetic paint according to an embodiment of the present invention may further include generating the video information corresponding to the ground.

Here, the distance between the electromagnet and the ground may be adjusted based on the video information.

As another embodiment of the present invention, a magnetic pattern may be applied to lanes with magnetic paint using the following method.

According to an embodiment of the present invention, when magnetic paint is applied to the ground to correspond to lanes, alternating write magnetic fields may be applied to the magnetic paint simultaneously therewith such that the lanes have an alternating magnetic pattern.

Alternatively, an embodiment of the present invention may be configured such that, after magnetic paint is applied to the ground to correspond to lanes, alternating write magnetic fields are applied to the magnetic paint.

Here, the magnetic paint may be mixed with ferromagnetic particles or ferrimagnetic particles.

Alternatively, an embodiment of the present invention may be configured such that general paint including no magnetic particles is applied, and lanes may be constructed by spreading ferromagnetic or ferrimagnetic particles thereon.

Here, an embodiment of the present invention may be configured such that, after conventional paint is applied, ferromagnetic or ferrimagnetic particles are applied to the paint, or such that, after ferromagnetic or ferrimagnetic particles are spread, general paint is applied to cover the particles, rather than using paint mixed with magnetic particles, whereby lanes may be constructed.

Here, it is desirable that the particles used for magnetic paint have a shape other than a symmetrical shape (e.g., a sphere, a square, or the like), and the particles are distributed using a mesh or the like, whereby the direction in which the magnetic particles are arranged may be adjusted.

Also, it is desirable that the interval of the magnetic pattern recorded on the lane using magnetic paint be equal to or less than 5 m.

Also, according to an embodiment of the present invention, a device for supplying power (a portable power generator) and a current supplier may supply electric power of 10 kW or more and current of 100 A or more, respectively, but are not limited to the above-described specifications. The specifications may be flexibly set depending on the amounts of electric power and current required for applying a magnetic pattern.

Figure 14:
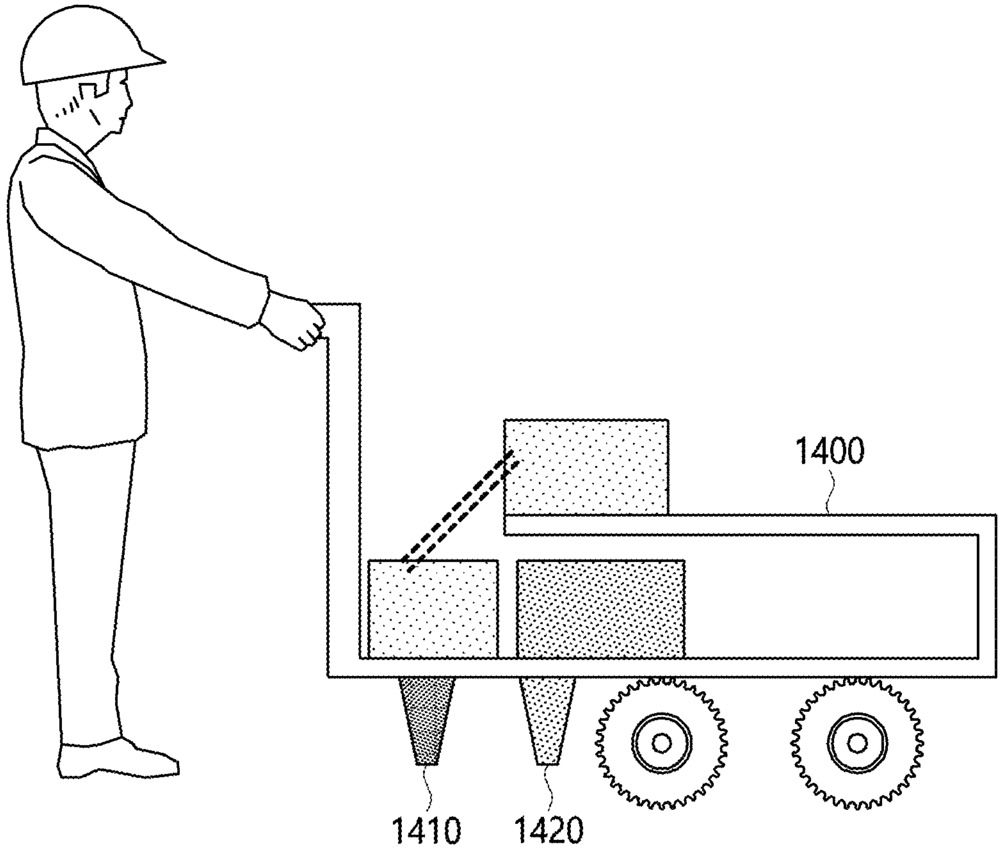
FIG. 14 is a view illustrating an apparatus for applying a magnetic pattern to lanes with magnetic paint according to an embodiment of the present invention.

FIG. 14 is a view illustrating an apparatus for applying a magnetic pattern to lanes with magnetic paint according to an embodiment of the present invention.

Referring to FIG. 14, the apparatus for applying a magnetic pattern to lanes with magnetic paint according to an embodiment of the present invention includes a moving object 1400, and an electromagnet 1410 and a paint application device 1420, which are attached to the moving object 1400.

Here, when a person is moving, with his/her hand, the moving object 1400, which has wheels, the paint application device 1420 may apply the base material of the paint to the ground so as to correspond to lanes, and a magnetic pattern may then be applied to the magnetic particles included in the paint corresponding to the lanes using the electromagnet 1410.

Figure 15:
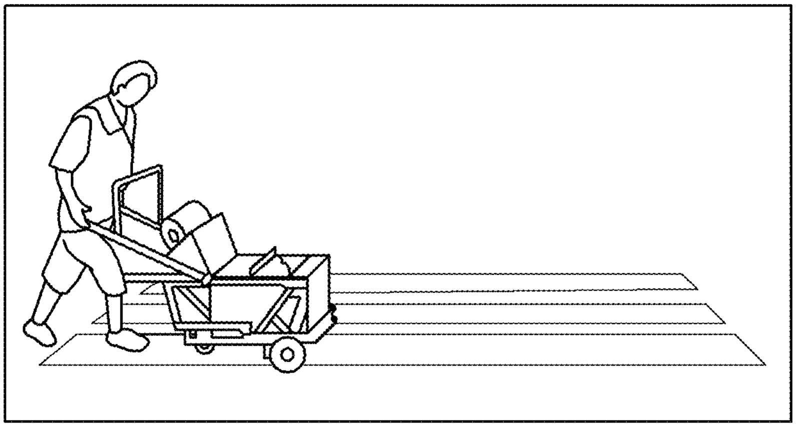
FIGS. 15 to 16 are views illustrating an example of a general portable device or cart for lane construction.
Figure 16:
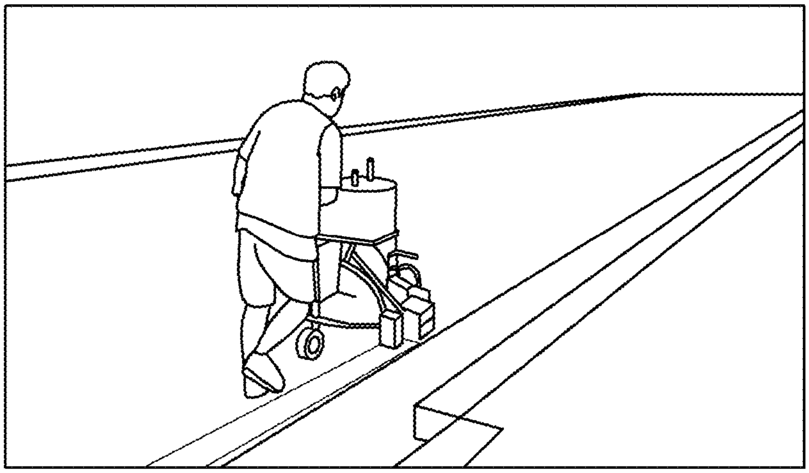

For example, the structure of the moving object 1400 is configured to be similar to the structure of a general portable lane construction device or a cart, illustrated in FIGS. 15 to 16, whereby a worker may apply a magnetic pattern simultaneously with the application of magnetic paint to correspond to lanes while manually moving the moving object 1400 with his/her hands.

Accordingly, the worker may perform the task of applying an alternating magnetic pattern to a lane by manually moving the moving object 1400 even in a place that is difficult for a large construction vehicle to enter, such as a short or narrow lane, a small parking lot, or the like.

Figure 17:
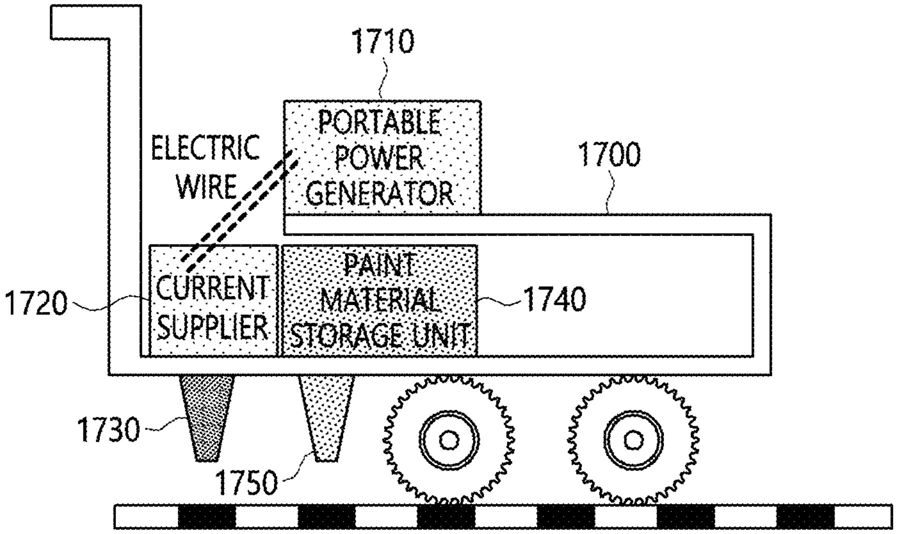
FIG. 17 is a view illustrating the detailed configuration of the apparatus for applying a magnetic pattern to lanes with magnetic paint, illustrated in FIG. 14.

FIG. 17 is a view illustrating the detailed configuration of the apparatus for applying a magnetic pattern to lanes with magnetic paint, illustrated in FIG. 14.

Referring to FIG. 17, the apparatus for applying a magnetic pattern to lanes with magnetic paint may include an electromagnet 1730 for generating a write magnetic field toward the ground by being installed in a moving object 1700, a current supplier 1720 for providing the current required to generate a write magnetic field, a portable power generator 1710 for supplying power required in order for the current supplier 1720 to generate current, and a cooler (not illustrated) for dissipating the heat generated from at least one of the electromagnet 1730, the current supplier 1720, and the portable power generator 1710.

Here, the magnetic particles included in the base material of the paint applied to the ground to correspond to lanes may be ferromagnetic particles having a coercive force greater than 100 Oersted (Oe) and equal to or less than 1000 Oe.

For example, maghemite particles, such as ferric oxide ($\gamma$(gamma)-$Fe_2O_3$)), may be used in the state of being included in the base material of the paint.

Here, the maghemite particles, which are ferromagnetic particles, have a remanent magnetization detectable by a magnetic sensor only when a write magnetic field, the strength of which is greater than the coercive force, is applied thereto. Accordingly, the greater the strength of the write magnetic field, the greater the remanent magnetization and the stronger the detection signal generated by the maghemite particles, whereby the magnetic sensor may acquire a more clear signal.

Hereinafter, a maghemite particle according to an embodiment of the present invention will be described in more detail with reference to FIGS. 19 to 22.

Figure 19:
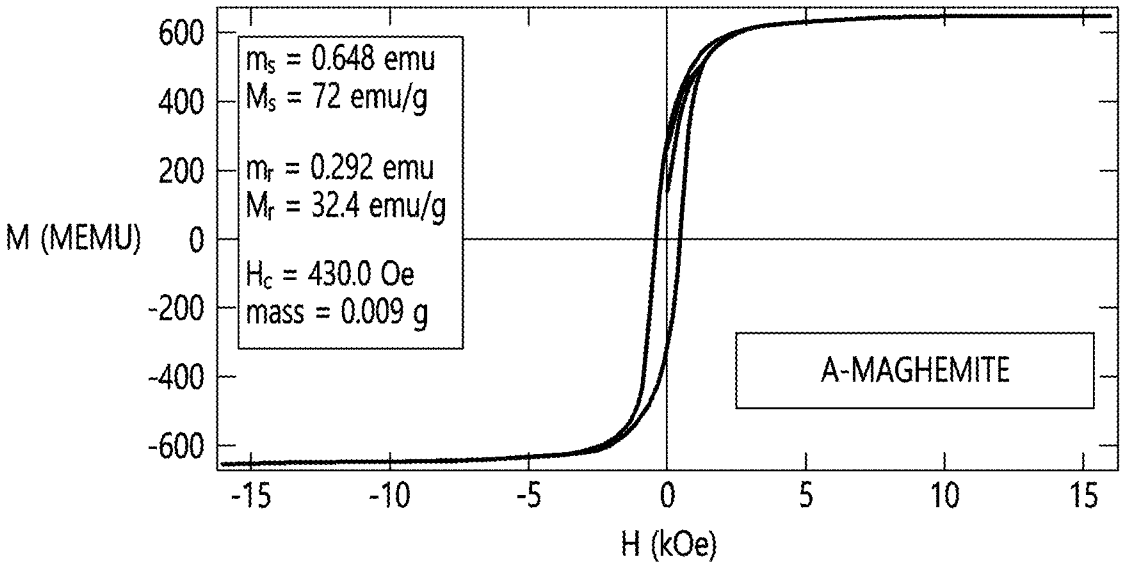
FIGS. 19 to 20 are views illustrating an example of the magnetic characteristics of a maghemite particle, which is one of ferromagnetic particles according to the present invention.
Figure 20:
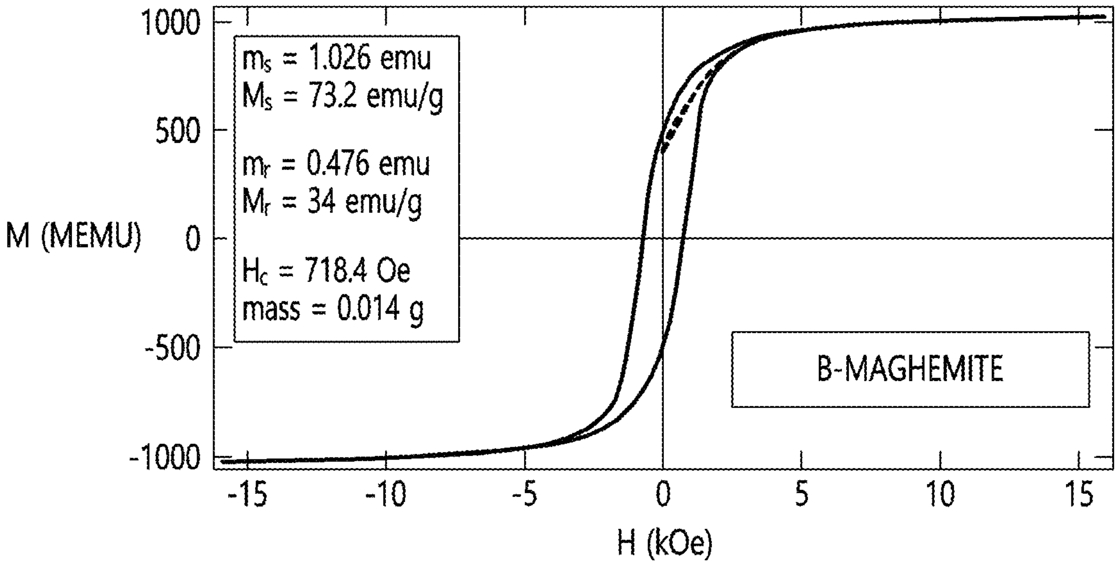

First, FIG. 19 and FIG. 20 are views illustrating the magnetic characteristics of two types of maghemite particles having characteristics corresponding to the present invention, and it can be seen that the A-maghemite particle illustrated in FIG. 19 has a coercive force of 430 Oe and a remanent magnetization of 34.4 emu/g and that the B-maghemite particle illustrated in FIG. 20 has a coercive force of 718 Oe and a remanent magnetization of 34 emu/g.

Here, the difference in the magnetic characteristics between the two types of maghemite particles illustrated in FIG. 19 and FIG. 20 may be the result of adjusting a heat-processing temperature and heat-processing conditions. Through such adjustment, the coercive force may be decreased to about 100 Oe, or may be increased to be equal to or greater than 1000 Oe. Accordingly, when maghemite particles having a controllable coercive force are used as magnetic particles according to an embodiment of the present invention, an alternating magnetic pattern may be applied to lanes using a magnetic field having a small strength.

Figure 21:
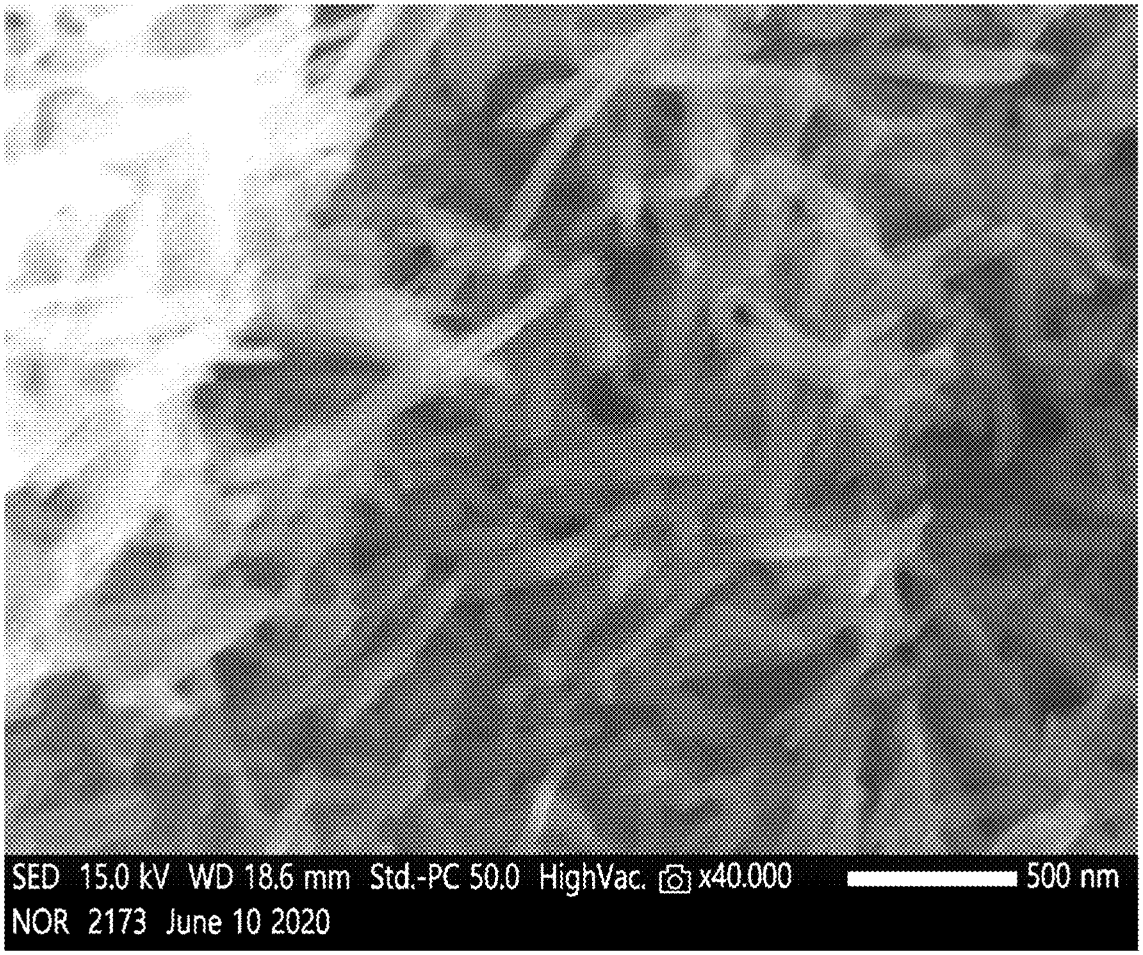
FIG. 21 is a view illustrating an image obtained using an electron microscope that shows the shape and size of a maghemite particle according to an embodiment of the present invention.

Here, referring to FIG. 21, because a maghemite particle according to an embodiment of the present invention has a needle shape, of which the diameter and the length are 0.05 μm and 0.8 μm, respectively, magnetic anisotropy energy by which magnetization is autonomously performed in the length direction is provided, whereby magnetic characteristics may be prevented from being lost at high temperatures, that is, heat stability may be secured.

Figure 22:
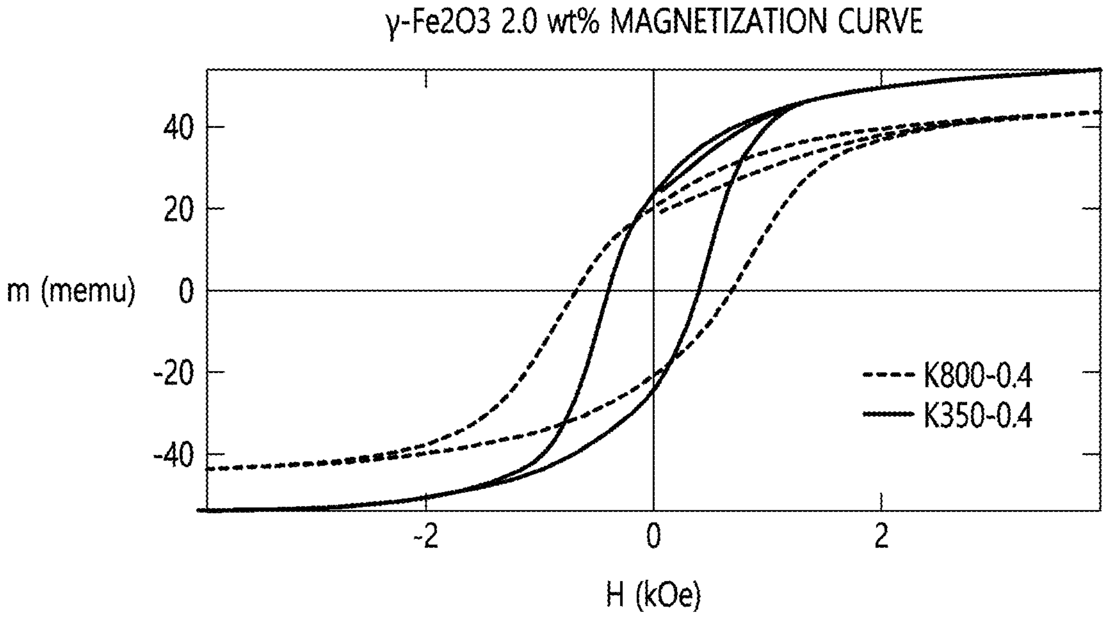
FIG. 22 is a view illustrating the magnetic characteristics of paint made of the maghemite particles illustrated in FIGS. 19 to 20.

FIG. 22 is a view illustrating the magnetic characteristics of paint made of the two types of maghemite particles illustrated in FIG. 19 and FIG. 20, and the magnetic characteristics of the paint are not much different from those of the maghemite particles, but remanent magnetization thereof may be reduced.

Here, the graph illustrated in FIG. 22 is a graph representing values that are measured when the strength of an applied magnetic field, represented on the X-axis, is 4 kOe, unlike the graphs of FIGS. 19 to 20.

Figure 23:
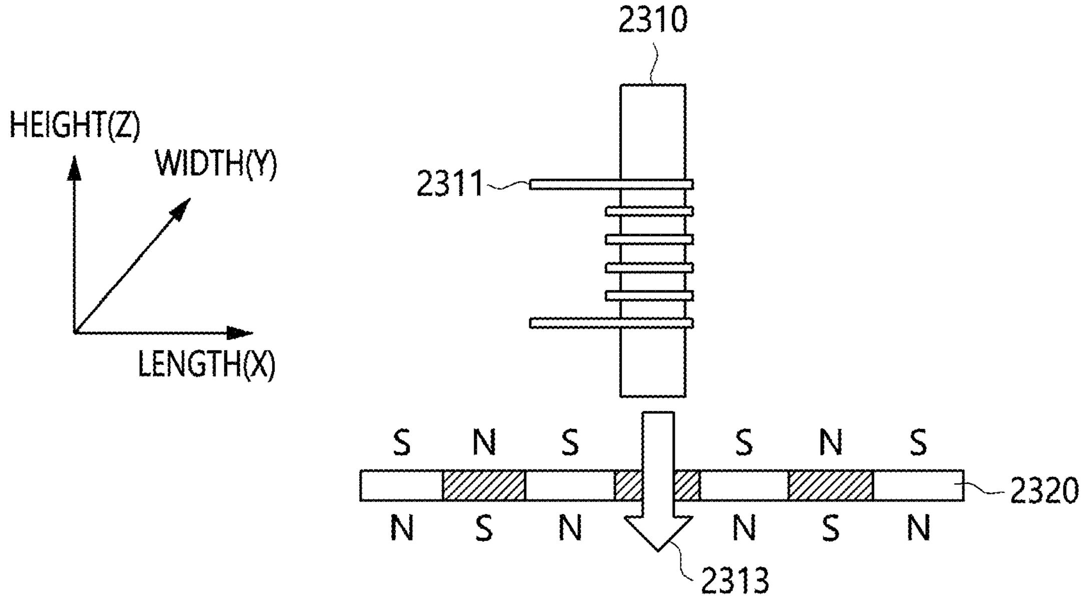
FIG. 23 is a view illustrating application of a magnetic pattern to lanes using an electromagnet according to an embodiment of the present invention.

An electromagnet 1730 for generating a write magnetic field toward the ground on which lanes are drawn may be configured as a magnetic body wound with a coil 2311, as illustrated in FIG. 23, and a write magnetic field may be generated by applying current to the coil 2311. Here, the magnetic body may be a ferromagnetic body, and the coil 2311 may be supplied with current from a current supplier by being connected therewith.

Here, the electromagnet 1730 generates a write magnetic field when it passes over the paint 1020 including the magnetic particles applied to the ground, that is, the lanes, thereby applying an alternating magnetic pattern in which N and S poles are repeated.

Here, the electromagnet may include a main pole for providing a write magnetic field and an auxiliary pole for absorbing the magnetic flux generated by the main pole.

Figure 24:
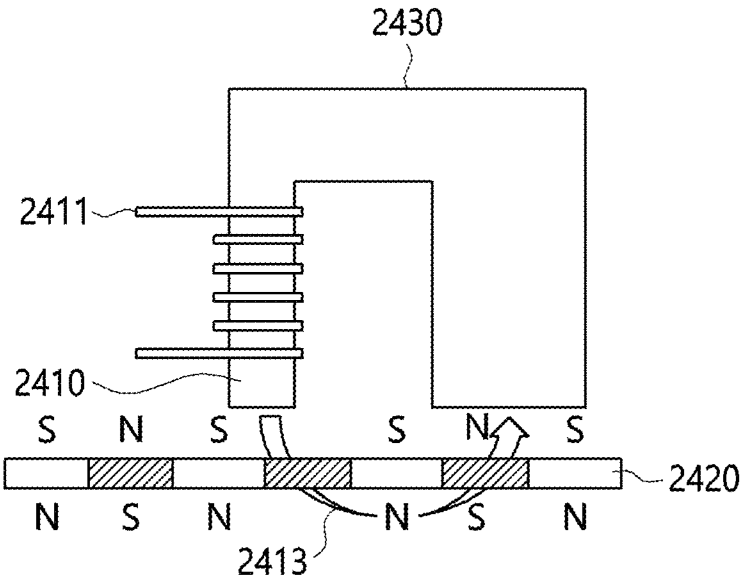
FIGS. 24 to 25 are views illustrating an electromagnet configured with a main pole and an auxiliary pole according to an embodiment of the present invention.
Figure 25:
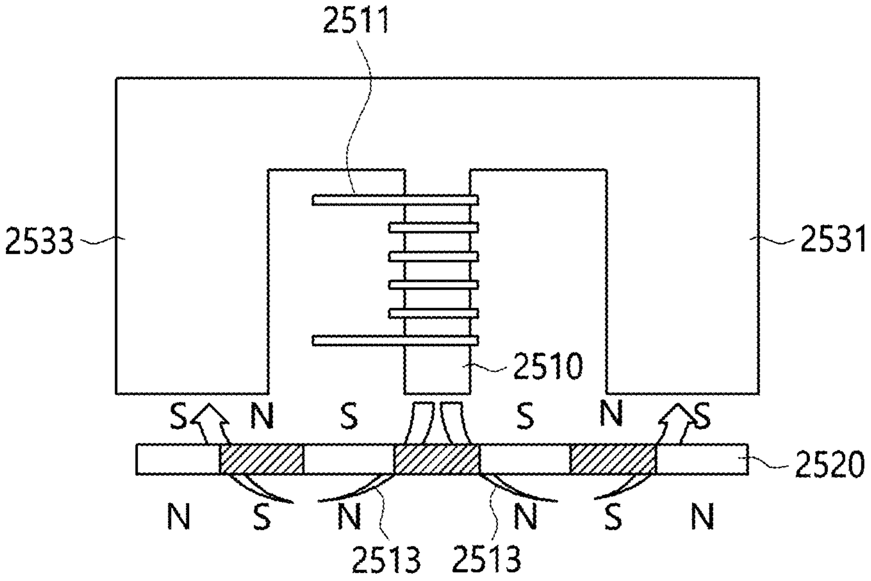

For example, referring to FIGS. 24 to 25, the electromagnet according to an embodiment of the present invention may include a main pole for providing a write magnetic field and an auxiliary pole (a trailing pole or a leading pole) for absorbing the magnetic flux generated by the main pole. Here, because the efficiency of generation of a write magnetic field is low in the case of an electromagnet including only a main pole, the efficiency of generation of a write magnetic field may be improved using an auxiliary pole.

First, referring to FIG. 24, the electromagnet may include a main pole 2410 wound with a coil 2411 and an auxiliary pole 2430 for absorbing the magnetic flux of the main pole 2410 on any one of the front and rear sides of the main pole 2410.

Alternatively, as illustrated in FIG. 25, the electromagnet may be formed so as to include a main pole 2510 wound with a coil 2511 and auxiliary poles 2531 and 2533 for absorbing the magnetic flux of the main pole 2510 on the front and rear sides of the main pole 2410.

Here, the magnetic flux 2413 or 2513 generated by the main pole 2410 or 2510 is absorbed by the auxiliary pole 2430 or the auxiliary poles 2531 and 2533, whereby a magnetic pattern may be more efficiently applied to magnetic paint corresponding to lanes.

The electromagnet according to an embodiment of the present invention may have various forms in order to efficiently generate a write magnetic field, but the case where a vertical magnetic recording method using an electromagnet having only a single main pole is used will be described hereinbelow. This is because the remanent magnetization of a ferromagnetic body in paint can be more easily detected by a magnetic sensor when the remanent magnetization is turned into a vertical component.

Here, because a write magnetic field is affected by the vertical magnetic component in a height (Z) direction, the vertical magnetic component may be considered as an important factor.

For example, the main pole of the electromagnet 2310 illustrated in FIG. 23 has a parallelepiped shape, of which the length, the width, and the height are given as L=100 mm, W=150 mm, and D=50 mm, respectively, and the remanent magnetization Br may be assumed to be 20 KG, 16 kG, 15 KG, 10 KG, 5 KG, or 4 kG. Here, variation in a write magnetic field Bz in a vertical direction 2313 from the center of the rectangular surface of the electromagnet 2310 facing the ground may be calculated as shown in Equation (2) below:

$$B_z = \frac{B_r}{\pi}\left[\arctan\left(\frac{LW}{2x\sqrt{4z^2 + L^2 + W^2}}\right) - \arctan\left(\frac{LW}{2(D+z)\sqrt{4(D+z)^2 + L^2 + W^2}}\right)\right] \quad (2)$$

Figure 26:
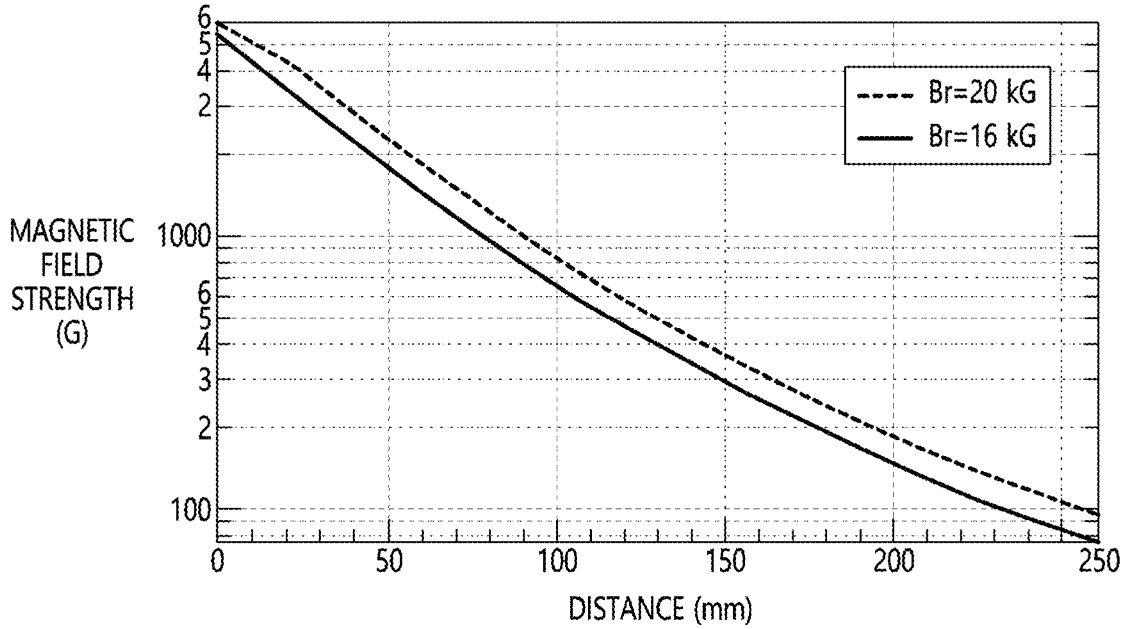
FIGS. 26 to 28 are views illustrating graphs representing variation in a vertical magnetic component depending on the height of an electromagnet in an embodiment of the present invention.
Figure 27:
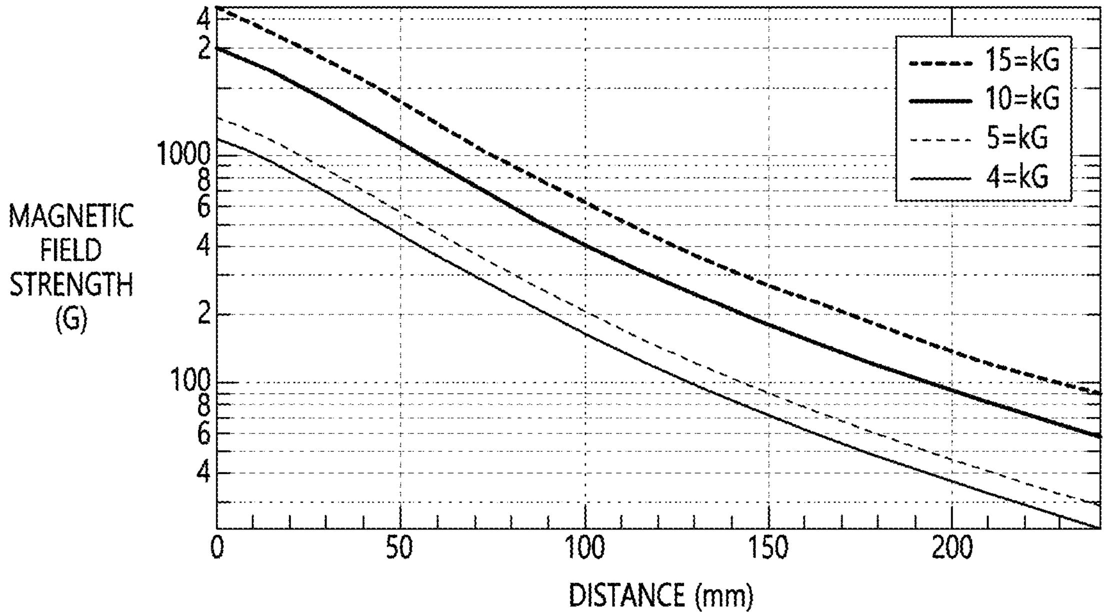
Figure 28:
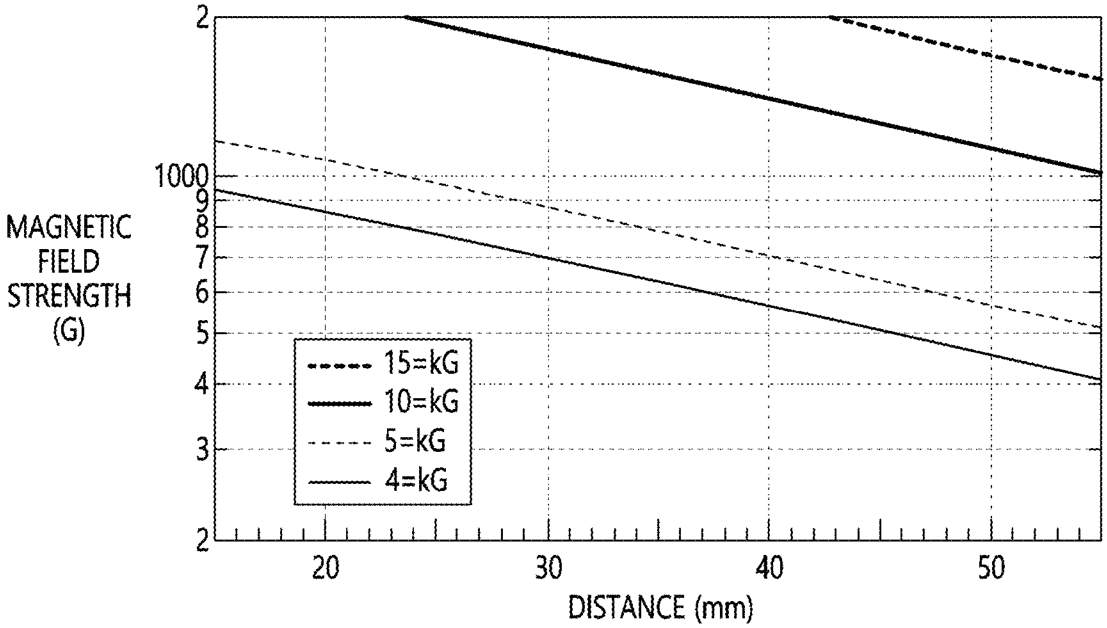

The graphs illustrated in FIGS. 26 to 28 represent variation in a vertical magnetic component in the height (Z) direction (on a logarithmic scale) based on Equation (2) when an electromagnet is configured with only a main pole having a remanent magnetization $B_r$ of 20 KG, 16 kG, 15 kG, 10 kG, 5 kG, or 4 kG. Referring to the graphs illustrated in FIGS. 26 to 28, it can be seen that the strength of a write magnetic field rapidly decreases as the electromagnet is more distant from the ground.

Here, because an actual electromagnet has a complex 3D shape, when the strength of the write magnetic field $B_z$ is calculated in consideration of magnetic lines coming out of all surfaces of the electromagnet, the strength may be less than the value calculated using Equation (2).

Also, the electromagnet 1730 at a location distant from the ground may generate a write magnetic field having a strength greater than the coercive force of magnetic particles.

This is because ferromagnetic particles included in the base material of paint for drawing lanes may have a remanent magnetization detectable by a magnetic sensor in a vehicle only when a write magnetic field having a strength greater than the coercive force of the ferromagnetic particles is applied.

Accordingly, the electromagnet according to the present invention has to generate a write magnetic field having a strength greater than the coercive force of the ferromagnetic particles according to the present invention at a location distant from the ground, and may have a magnetic strength capable of satisfying this condition.

Here, because the remanent magnetization possessed by magnetic particles included in the base material of the paint for drawing lanes increases as the strength of the write magnetic field generated by the electromagnet is greater, a magnetic sensor in a vehicle may acquire a more clear signal.

Also, the distance from the ground to the electromagnet 1730 may be greater than 0 mm and equal to or less 300 mm. The distance may be a value that is set in consideration of the coercive force of the magnetic particles and the remanent magnetization of the electromagnet according to an embodiment of the present invention.

For example, it may be assumed that a write magnetic field is applied to paint, in which maghemite particles A having a coercive force of 430 Oe are included, using an electromagnet having a remanent magnetization of 4 kG. Here, referring to FIG. 27, it can be seen that maghemite particles A can have a remanent magnetization only when the distance between the electromagnet and the paint is maintained equal to or less than about 55 mm.

In another example, it may be assumed that a write magnetic field is applied to paint, in which maghemite particles B having a coercive force of 718 Oe are included, using an electromagnet having a remanent magnetization of 4 kG. Here, referring to FIG. 27, it can be seen that maghemite particles B can have a remanent magnetization only when the distance between the electromagnet and the paint is maintained equal to or less than about 29 mm.

Accordingly, when maghemite particles A and maghemite particles B are included in paint, a write magnetic field may be applied while the distance between the electromagnet and the ground to which the paint is applied is maintained equal to or less than about 2 cm, in which case the electromagnet may be designed to have a remanent magnetization of 4 kG.

Here, because the above example is affected by the write magnetic field calculated using Equation (2), the actual distance needs to be maintained less than the proposed value.

As described above, the distance between the electromagnet and the ground may be an important factor for determining the strength of a signal coming out of the magnetic particles included in paint, and is closely related to the specifications of the current supplier and the portable power generator to be described later.

For example, when the electromagnet is designed to be located close to the ground, there is no problem even if a current supplier and a portable power generator having relatively low specifications (providing a low amount of current and power) are provided. Conversely, when the electromagnet is designed to be located distant from the ground, it may be necessary to provide a current supplier and a portable power generator having relatively high specifications (providing a high amount of current and power).

In another example, when a current supplier and a portable power generator having relatively low specifications (providing a low amount of current and power) are provided, the electromagnet may be designed to be located close to the ground. Conversely, when a current supplier and a portable power generator having relatively high specifications (providing a high amount of current and power) are provided, the electromagnet may be designed to be located distant from the ground.

Consequently, the specifications of the current supplier and the portable power generator, the shape of the electromagnet, the distance from the electromagnet to the ground, and the like may be adjusted based on the coercive force of ferromagnetic particles included in the base material of paint in the present invention.

Figure 29:
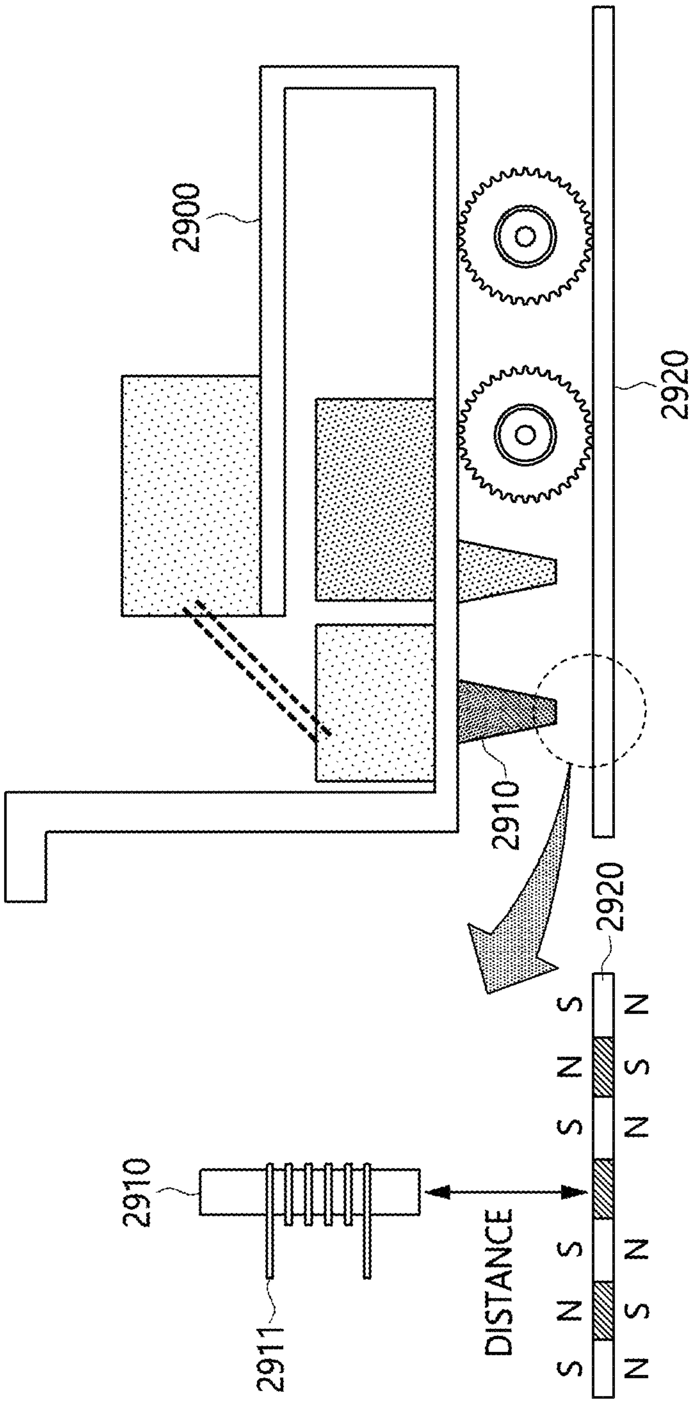
FIG. 29 is a view illustrating the distance between an electromagnet and the ground according to an embodiment of the present invention.

Here, the distance between the electromagnet and the ground may be the distance between the electromagnet 2910 installed in the moving object 2900 and the ground 2920, to which paint is applied, as illustrated in FIG. 29.

Here, the electromagnet 2910 wound with a coil 2911 may adjust the strength of a write magnetic field generated thereby depending on the distance from the ground 2920 on which lanes are to be drawn. This will be described in detail later with reference to FIG. 30.

The current supplier 1720 may supply current required for generating a write magnetic field to the electromagnet 1730.

Here, the current supplier 1720 may be configured as a circuit capable of providing alternating current (AC) to the electromagnet 1730.

Here, in order to apply a magnetic pattern to magnetic particles included in lanes using the above-described electromagnet 1730 of the present invention, a large amount of current is required, and the required amount may be calculated using Equation (1).

In Equation (1), B denotes a magnetic field, and $\mu$ and $\mu_r$ respectively denote the permeability and relative permeability of a material. In the following embodiment, the material is assumed to be pure iron, so the relative permeability is set to 1000. Also, to denotes magnetic permeability in a vacuum, N (=N turns/L) denotes the number of turns of a coil wound around pure iron, and i denotes the amount of current that is applied.

When B is assumed to be 4 kG and when the value of N is given as N=80 turns/5 cm (that is, when an electromagnet has to generate a write magnetic field of 4 kG and when 80 turns of a coil are wound around pure iron having a thickness of 5 cm), the current supplier has to apply an alternating current of about 40 A (RMS) to the coil.

Also, when the resistance of the coil is assumed to be about 0.6Ω and when an alternating magnetic field of 60 Hz is assumed, a voltage of 24 V is required. Accordingly, the electric power required for the electromagnet is calculated to be at least 1.0 kW.

Here, when an actual complex 3D electromagnet is considered, 1.0 kW is an underestimated value. However, using only 1.5 kW or less of electric power, a write magnetic field of 4 kG may be generated.

Meanwhile, the required amount of electric power may increase or decrease depending on the distance between the electromagnet and the paint including magnetic particles, which is applied to the ground to correspond to lanes, and on the magnetic characteristics of the magnetic particles contained in the paint corresponding to the lanes.

Accordingly, the current supplier 1720 according to the present invention may supply a current of 100 amperes or less in consideration of the characteristics of the electromagnet and those of the magnetic particles, and the portable power generator 1710 provided for the current supplier 1720 may supply a power of 3 kW or less.

The portable power generator 1710 may supply power required in order for the current supplier 1720 to generate current, and may supply AC power.

Generally, power is supplied from an internal power supply in a building or the like, but because it is necessary to supply power outdoors when lanes are constructed according to an embodiment of the present invention, the portable power generator 1710 may be installed in the moving object 1700 along with the electromagnet 1730 and the current supplier 1720.

Here, because the portable power generator 1710 according to the present invention only needs to supply power of 3 kW or less in consideration of the electromagnet 1730 and the current supplier 1720, a small diesel power generator, which has been commercialized in a portable form, may be used therefor, and an air-cooled-type power generator may be provided.

Figure 18:
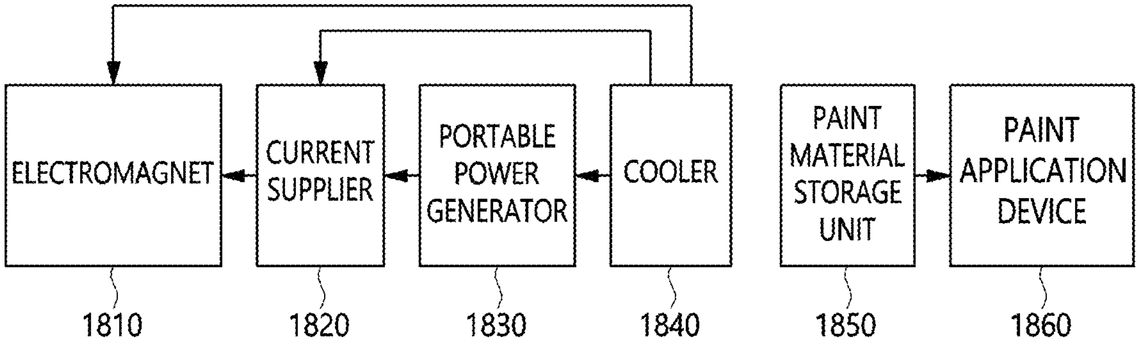
FIG. 18 is a block diagram illustrating an apparatus for applying a magnetic pattern to lanes with magnetic paint according to an embodiment of the present invention.

Also, the apparatus for applying a magnetic pattern to lanes with magnetic paint according to an embodiment of the present invention may further include a cooler 1840, as illustrated in FIG. 18.

Here, the cooler 1840 serves to dissipate the heat generated from at least one of the electromagnet 1810, the current supplier 1820, and the portable power generator 1830.

For example, heat may be generated from the electromagnet 1810, the current supplier 1820, and the portable power generator 1830 in the process of supplying electric power, and when the heat is ignored, damage thereto may be caused. Accordingly, the heat generated from the electromagnet 1810, the current supplier 1820, and the portable power generator 1830 is circulated using the cooler 1840, whereby the amount of heat generated in the respective devices may be reduced.

However, because the current supplier 1820 and the portable power generator 1830 in the apparatus having a miniaturized structure according to the present invention supply current of 100 amperes or less and power of 3 kW or less, respectively, it is less likely that heat is actually generated from the current supplier 1820 or the portable power generator 1830.

Accordingly, the major role of the cooler 1840 may be cooling the electromagnet 1810 from which heat is generated due to joule heating when current is flowing, and both a water-cooling type and an air-cooling type are available.

Also, the apparatus for applying a magnetic pattern to lanes with magnetic paint according to an embodiment of the present invention may further include a paint material storage unit 1740 for storing the base material of the paint and a paint application device 1750 for applying the base material of the paint to the ground.

Here, the base material of the paint may be paint including ferromagnetic particles having a coercive force greater than 100 Oersted (Oe) and equal to or less than 1000 Oe.

Accordingly, the paint application device 1750 is able to apply the paint including magnetic particles, which is stored in the paint material storage unit 1740, to the ground so as to correspond to lanes when the moving object 1700 is moving, thereby drawing the lanes for providing information related to driving to a vehicle having a magnetic sensor or an autonomous vehicle.

Also, although not illustrated in FIG. 17, the apparatus for applying a magnetic pattern to lanes with magnetic paint according to an embodiment of the present invention may include a magnetic particle storage unit (not illustrated) for storing magnetic particles and a magnetic particle application unit (not illustrated) when magnetic particles are not included in the base material of the paint.

That is, although visible lanes have been drawn on the ground, when magnetic particles are not included therein, only magnetic particles are additionally applied thereto, whereby a magnetic pattern may be applied.

When a magnetic particle application unit (not illustrated) is provided, it may be installed behind the paint application device 1750 and in front of the electromagnet 1730 based on the direction in which the moving object illustrated in FIG. 17 travels.

Here, the magnetic particle application unit (not illustrated) is located between the paint application device 1750 and the electromagnet 1730, whereby paint may be applied to the ground to correspond to lanes using the paint application device 1750, magnetic particles may be applied to the paint corresponding to the lanes using the magnetic particle application unit (not illustrated), and then a magnetic pattern may be applied to the magnetic particles included in the lanes using the electromagnet 1730.

Here, the electromagnet 1730 may be installed behind the paint application device 1750 based on the direction in which the moving object 1700 travels.

Accordingly, the paint application device 1750 first applies the paint including magnetic particles to the ground to correspond to lanes, after which the electromagnet 1730 may apply a magnetic pattern to the magnetic particles included in the paint corresponding to the lanes at the rear.

Here, the magnetic pattern applied to the lanes through a write magnetic field may be recognized by a vehicle including a magnetic sensor when the vehicle is being driven.

For example, the magnetic sensor may detect not only the magnetic pattern but also a magnetic signal caused by the irregularity of a road surface, deformation or imbalance of tires, an engine, a vehicle itself, vibration caused during driving, or the like as noise. Here, because the noise commonly has a frequency equal to or less than 30 Hz, it is desirable that the signal of the alternating magnetic pattern to be detected from the magnetic paint have a frequency equal to or greater than 30 Hz in order to recognize only the magnetic pattern, excluding the noise. That is, the alternating magnetic pattern is applied such that the noise is differentiated therefrom, whereby noise may be avoided and a high signal-to-noise ratio may be achieved.

Also, the magnetic paint included in lanes for autonomous driving has a remarkable effect when a vehicle is being driven at a speed equal to or greater than 20 km/h, compared to when being driven at low speed. Therefore, in order to make the frequency of the magnetic pattern equal to or greater than 30 Hz at speeds equal to or greater than 20 km/h, it is desirable to set the interval of the magnetic pattern recorded on a lane to be equal to or less than 5 m.

Also, the apparatus for applying a magnetic pattern to lanes with magnetic paint according to an embodiment of the present invention may further include a surface protection unit (not illustrated) installed in the surface of the electromagnet 1730 facing the ground.

Here, the surface protection unit may serve to prevent impurities or the like from becoming attached to the surface of the electromagnet 1730 facing the ground and to prevent the electromagnet from being damaged.

Accordingly, it is desirable that the surface protection unit be formed of a nonmagnetic material.

For example, the surface protection unit may prevent contamination of the electromagnet, which occurs when nearby iron powder, magnetic powder, or the like adheres to the electromagnet due to the magnetic field generated by the electromagnet. Also, the surface protection unit may prevent damage to the surface of the electromagnet facing the ground due to friction or scratches when the distance between the electromagnet and the ground is short.

Also, the apparatus for applying a magnetic pattern to lanes with magnetic paint according to an embodiment of the present invention may further include a ground sensor (not illustrated) for generating video information corresponding to the ground.

Here, the ground sensor may be a distance sensor for measuring the distance from the ground, a general camera, or a camera capable of extracting depth information.

For example, when the ground sensor is a distance sensor, the video information may be generated based on the distance from the ground in a specific area using the distance sensor, and information about the distance from the ground may be extracted.

In another example, when the ground sensor is a general camera, the video information may include an image captured using the general camera and the distance from the ground, which is measured by analyzing the image.

Here, the current supplier 1720 may adjust the magnitude of current based on the video information.

Figure 30:
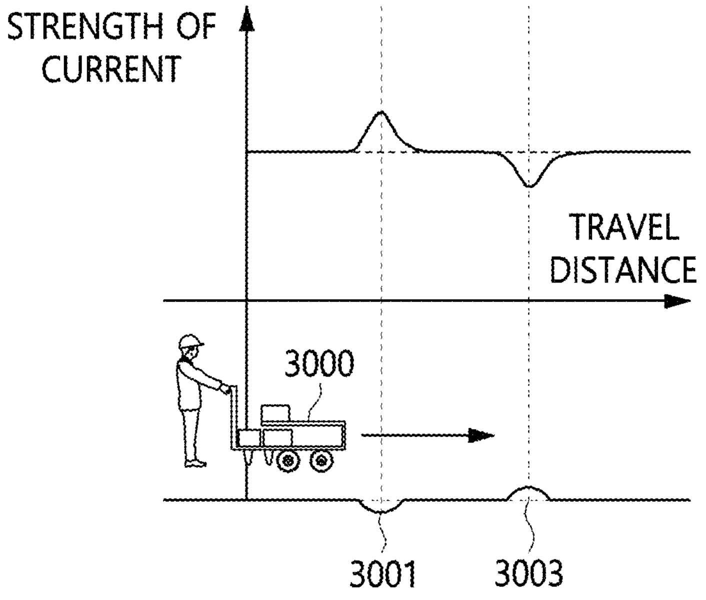
FIG. 30 is a view illustrating an example in which the strength of the current of an electromagnet is adjusted according to the present invention.

For example, referring to FIG. 30, when a moving object 3000 controlled by a person encounters a groove 3001 or a raised spot 3003 on the ground while moving on the ground, the distance between the electromagnet installed in the moving object 3000 and the ground may be changed. In this case, a write magnetic field having uniform and accurate strength cannot be applied to the magnetic particles included in the paint applied to the groove 3001 or the raised spot 3003.

Accordingly, the current supplier according to the present invention provides current having a strength greater than a reference strength when the moving object 3000 passes over the groove 3001, but provides current having a strength less than the reference strength when the moving object 3000 passes over the raised spot 3003, thereby enabling a write magnetic field having uniform strength to be generated toward the magnetic particles applied to the ground so as to correspond to the lanes.

Here, the reference for the strength of current may be the strength of current provided when passing over the ground without a groove 3001 or a raised spot 3003.

Here, the groove 3001 or the raised spot 3003 may be recognized using video information generated by the ground sensor.

Here, the distance from the ground to the electromagnet 1703 may be adjusted based on the video information.

Figure 31:
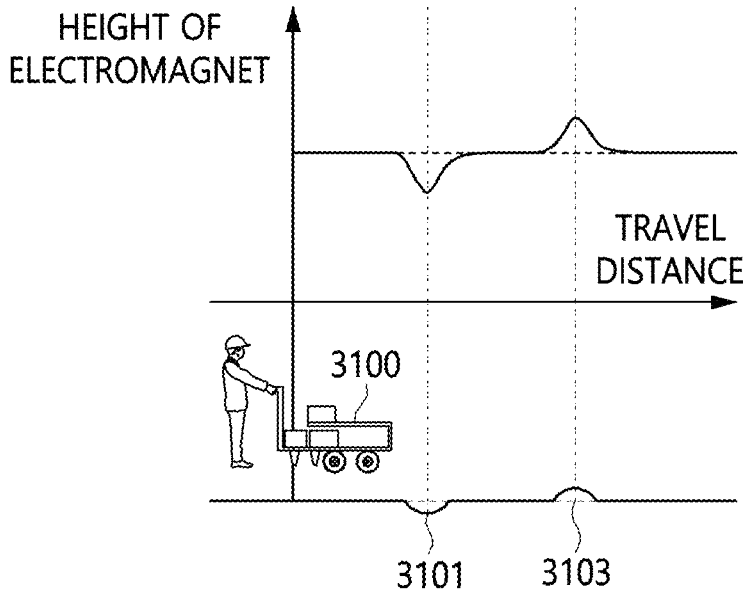
FIG. 31 is a view illustrating an example in which the height of an electromagnet is adjusted according to the present invention.

For example, referring to FIG. 31, when a moving object 3100 controlled by a person encounters a groove 3101 or a raised spot 3103 on the ground while moving on the ground, the distance between the electromagnet installed in the moving object 3100 and the ground may be changed. In this case, a write magnetic field having uniform and accurate strength cannot be applied to the magnetic particles included in the paint that are applied to the groove 3101 or the raised spot 3103.

Accordingly, the electromagnet according to the present invention may be moved downwards to the ground when the moving object 3100 passes over the groove 3101, and may be moved upwards in the direction opposite the direction toward the ground when the moving object 3100 passes over the raised spot 3103, whereby a write magnetic field having uniform strength may be generated toward the magnetic particles applied to the ground so as to correspond to the lanes.

Here, the groove 3101 or the raised spot 3103 may be recognized using the video information generated by the ground sensor.

Here, the apparatus for applying a magnetic pattern to lanes with magnetic paint according to an embodiment of the present invention may include a controller for controlling the electromagnet, the current supplier, the portable power generator, the cooler, the paint material storage unit, the paint application device, and the ground sensor, and the controller may be a computer system including a processor, memory, storage, and the like, as illustrated in FIG. 33.

Through the above-described apparatus for applying a magnetic pattern to lanes with magnetic paint, a person may apply a magnetic pattern to magnetic paint corresponding to lanes by moving the apparatus using his/her hands in a place that is difficult for an assistance vehicle or a large construction vehicle to enter.

Also, a magnetic pattern may be applied to magnetic paint corresponding to lanes such that an alternating magnetic pattern recognizable by an autonomous vehicle is generated using only electric power supplied from a miniaturized power source.

Figure 32:
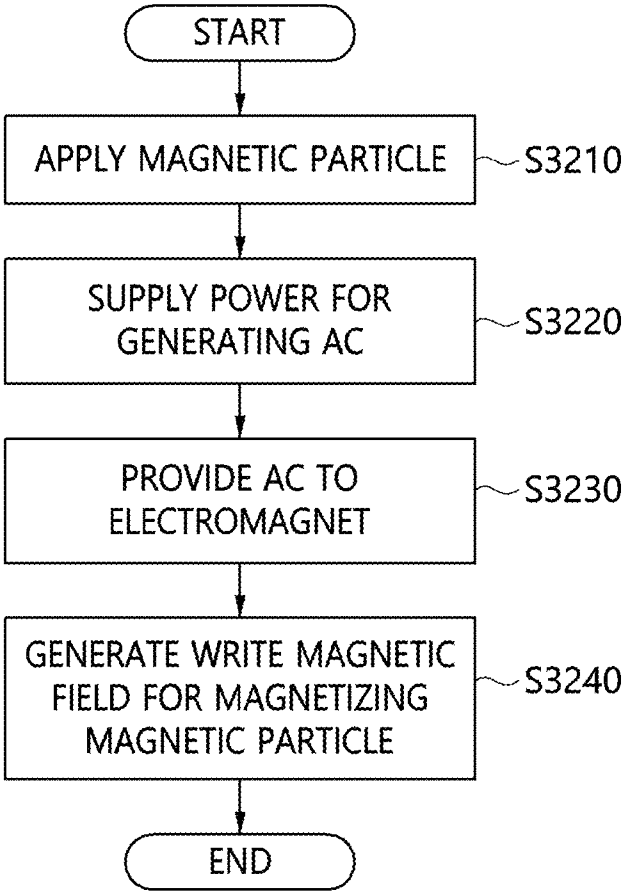
FIG. 32 is a flowchart illustrating a method for applying a magnetic pattern to lanes with magnetic paint according to an embodiment of the present invention.

FIG. 32 is a flowchart illustrating a method for applying a magnetic pattern to lanes with magnetic paint according to an embodiment of the present invention.

Referring to FIG. 32, in the method for applying a magnetic pattern to lanes with magnetic paint according to an embodiment of the present invention, first, magnetic particles corresponding to paint are applied to the ground so as to correspond to lanes at step S3210.

Also, in the method for applying a magnetic pattern to lanes with magnetic paint according to an embodiment of the present invention, power for generating alternating current (AC) is supplied at step S3220.

Also, in the method for applying a magnetic pattern to lanes with magnetic paint according to an embodiment of the present invention, alternating current is supplied to an electromagnet installed in a moving object at step S3230.

Here, the alternating current may be equal to or less than 100 amperes, and the power may be equal to or less than 3 kW.

Also, in the method for applying a magnetic pattern to lanes with magnetic paint according to an embodiment of the present invention, the electromagnet generates a write magnetic field for magnetizing the magnetic particles toward the ground at step S3240.

Here, the magnetic particles may be ferromagnetic particles having a coercive force greater than 100 Oersted (Oe) and equal to or less than 1000 Oe.

Here, the electromagnet may have a remanent magnetization capable of generating a write magnetic field having a strength greater than the coercive force of the magnetic particles at a location a certain distance from the ground.

Here, the distance from the ground to the electromagnet may be greater than 0 mm and equal to or less than 300 mm.

Also, although not illustrated in FIG. 32, in the method for applying a magnetic pattern to lanes with magnetic paint according to an embodiment of the present invention, paint is applied to the ground so as to correspond to the lanes using a paint application device.

Here, the electromagnet may be installed behind the paint application device based on the direction in which the moving object travels.

Here, the electromagnet may include a main pole for providing a write magnetic field and an auxiliary pole for absorbing the magnetic flux generated by the main pole.

Also, although not illustrated in FIG. 32, in the method for applying a magnetic pattern to lanes with magnetic paint according to an embodiment of the present invention, video information corresponding to the ground is generated.

Here, the magnitude of the alternating current may be adjusted based on the video information, and may then be provided.

Here, the distance from the ground to the electromagnet may be adjusted based on the video information.

Also, as an embodiment of the present invention, a magnetic pattern may be applied to paint including magnetic particles using the following method.

For example, when paint including magnetic particles is applied to the ground so as to correspond to the lanes, alternating write magnetic fields may be applied simultaneously therewith.

In another example, after paint including magnetic particles is applied to the ground so as to correspond to the lanes, alternating write magnetic fields may be applied.

In another example, a lane may be constructed by applying general paint to draw lanes and applying magnetic particles thereto, rather than using paint including magnetic particles. Alternatively, after magnetic particles are applied, general paint is applied to cover the magnetic particles, whereby construction of the lanes may be completed.

Here, it may be desirable for the interval of the magnetic pattern recorded on the lane using the magnetic particles to be equal to or less than 5 m.

Here, the method for applying a magnetic pattern to lanes with magnetic paint according to an embodiment of the present invention may be performed by a controller for performing the respective steps, and the controller may be a computer system including a processor, memory, storage, and the like, as illustrated in FIG. 33.

FIG. 33 is a view illustrating a computer system according to an embodiment of the present invention.

Referring to FIG. 33, an embodiment of the present invention may be implemented in a computer system including a computer-readable recording medium. As illustrated in FIG. 33, the computer system 3300 may include one or more processors 3310, memory 3330, a user-interface input device 3340, a user-interface output device 3350, and storage 3360, which communicate with each other via a bus 3320. Also, the computer system 3300 may further include a network interface 3370 connected to a network 3380. The processor 3310 may be a central processing unit or a semiconductor device for executing processing instructions stored in the memory 3330 or the storage 3360. The memory 3330 and the storage 3360 may be any of various types of volatile or nonvolatile storage media. For example, the memory may include ROM 3331 or RAM 3332.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, while a construction vehicle for constructing lanes is moving, a magnetic pattern may be applied simultaneously with construction of lanes.

Also, according to the present invention, a detailed configuration of a magnetic pattern application apparatus that is capable of accommodating a device for supplying sufficient electric power to apply a magnetic pattern to lanes may be presented.

According to the present invention, there may be provided an apparatus that has a miniaturized and lightweight structure and is capable of applying a magnetic pattern to lanes with magnetic paint while a person is moving the apparatus using his/her hands in a place that is difficult for an assistance vehicle or a large construction vehicle to enter.

Also, the present invention may provide technology for applying a magnetic pattern to lanes with magnetic paint such that an alternating magnetic pattern that can be recognized by autonomous vehicles is generated using only electric power supplied from a miniaturized and lightweight power source.

Also, the present invention may apply magnetic particles to previously constructed lanes, thereby applying a magnetic pattern that can be detected by autonomous vehicles thereto.

Also, the present invention may adjust parameter values related to application of a magnetic pattern depending on the road and ground conditions, thereby more effectively applying a magnetic pattern to lanes with magnetic paint.

The effects of the present embodiments are not limited to the above-mentioned effects, and other effects that have not been mentioned can be clearly understood by those skilled in the art from the appended claims.

As described above, the method and apparatus for applying a magnetic pattern to lanes with magnetic paint according to the present invention are not limitedly applied to the configurations and operations of the above-described embodiments, but all or some of the embodiments may be selectively combined and configured, so that the embodiments may be modified in various ways.

What is claimed is:

1. An apparatus for applying a magnetic pattern to lanes with magnetic paint, comprising:

an electromagnet for generating a write magnetic field toward a ground by being installed in a moving object;

a current supplier for providing a current required for generating the write magnetic field;

a portable power generator for supplying a power required in order for the current supplier to generate the current; and a cooler for dissipating heat generated from at least one of the electromagnet, the current supplier, and the portable power generator, wherein the current supplier and the portable power generator are installed in an auxiliary moving object that is separate from the moving object in which the electromagnet is installed.

2. The apparatus of claim 1, wherein magnetic particles included in a base material of the magnetic paint applied to the ground are ferromagnetic particles having a coercive force greater than 100 Oersted (Oe) and equal to or less than 1000 Oe, wherein the electromagnet is located at a distance from the ground, and the distance is greater than 0 mm and equal to or less than 300 mm, and wherein the current supplier supplies a current greater than 0 ampere and equal to or less than 100 amperes.

3. The apparatus of claim 2, wherein the electromagnet generates the write magnetic field having a strength greater than the coercive force of the magnetic particles.

* * * * *